(12) United States Patent
Luthra et al.

(10) Patent No.: US 10,929,353 B2
(45) Date of Patent: Feb. 23, 2021

(54) FILE TREE STREAMING IN A VIRTUAL FILE SYSTEM FOR CLOUD-BASED SHARED CONTENT

(71) Applicant: Box, Inc., Redwood City, CA (US)

(72) Inventors: Tanooj Luthra, San Diego, CA (US);
Ritik Malhotra, San Jose, CA (US);
Sri Sarat Ravikumar Tallamraju, Carmichael, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 15/140,292

(22) Filed: Apr. 27, 2016

(65) Prior Publication Data

US 2016/0321287 A1  Nov. 3, 2016

Related U.S. Application Data

(60) Provisional application No. 62/154,658, filed on Apr. 29, 2015.

(51) Int. Cl.
*G06F 16/30* (2019.01)
*G06F 16/182* (2019.01)
(Continued)

(52) U.S. Cl.
CPC .............. *G06F 16/182* (2019.01); *G06F 9/46* (2013.01); *G06F 12/0891* (2013.01);
(Continued)

(58) Field of Classification Search
CPC ................. G06F 17/30233; G06F 9/46; G06F 17/30156; G06F 17/30132;
(Continued)

(56) References Cited

U.S. PATENT DOCUMENTS 6,512,529 B1  1/2003  Janssen
6,750,858 B1  6/2004  Rosenstein
(Continued)

OTHER PUBLICATIONS

"Apache Thrift" Wikipedia, URL: https://en.wikipedia.org/wiki/Apache_Thrift, Oct. 27, 2015, Accessed on Jan. 26, 2016.
(Continued)

*Primary Examiner* — Kuen S Lu
(74) *Attorney, Agent, or Firm* — Vista IP Law Group, LLP

(57) ABSTRACT

Systems for fast views of items in file directories or file folders when interacting with a cloud-based service platform. A server in a cloud-based environment interfaces with one or more storage devices to provide storage of shared content accessible by two or more user devices. A file tree request to view the file directory or file folder of a particular sought after item is issued from an application operating on one of the user devices. Additional file tree items in a file tree hierarchy are prefetched by the cloud-based service platform. The application closes the file tree metadata stream after receiving the portion of the file tree that pertains to the particular item and before receiving the entirety of the metadata pertaining to all of the file tree metadata of all of the items in the directory or folder that contains the particular sought after item.

20 Claims, 16 Drawing Sheets

(51) Int. Cl.

| | | |
|---|---|---|
| *G06F 9/46* | (2006.01) | |
| *G06F 16/23* | (2019.01) | |
| *G06F 16/172* | (2019.01) | |
| *G06F 16/185* | (2019.01) | |
| *G06F 16/188* | (2019.01) | |
| *G06F 16/17* | (2019.01) | |
| *G06F 16/174* | (2019.01) | |
| *G06F 16/176* | (2019.01) | |
| *G06F 16/957* | (2019.01) | |
| *H04L 29/08* | (2006.01) | |
| *G06F 12/1081* | (2016.01) | |
| *H04L 29/06* | (2006.01) | |
| *G06F 12/0891* | (2016.01) | |
| *G06F 12/122* | (2016.01) | |
| *H04N 19/40* | (2014.01) | |
| *G06F 16/242* | (2019.01) | |
| *G06F 16/22* | (2019.01) | |
| *G06F 16/11* | (2019.01) | |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/602* (2013.01); *H04L 65/607* (2013.01); *H04L 65/80* (2013.01); *H04L 67/06* (2013.01); *H04L 67/1097* (2013.01); *H04L 67/34* (2013.01); *H04N 19/40* (2014.11); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(58) Field of Classification Search
CPC ........ G06F 17/30221; G06F 17/30171; G06F 17/30345; G06F 2212/60; G06F 2212/154; G06F 2212/1044; G06F 17/30194; G06F 17/30138; G06F 12/122; G06F 12/0891; G06F 17/30203; G06F 17/30902; G06F 16/182; G06F 16/23; G06F 16/172; G06F 16/183; G06F 16/185; G06F 16/188; G06F 16/1727; G06F 16/1748; G06F 16/1774; G06F 16/9574; G06F 12/1081; G06F 16/2443; G06F 16/22; G06F 16/196; G06F 16/113; G06F 2212/1016; G06F 2212/463; G06F 2212/657; H04L 63/0428; H04L 67/1097; H04L 67/06; H04L 65/602; H04L 65/607; H04L 65/80; H04L 67/34; H04N 19/40
USPC ........................................................ 707/831
See application file for complete search history.

(56) References Cited

U.S. PATENT DOCUMENTS

| | | | |
|---|---|---|---|
| 7,047,309 B2 | 5/2006 | Baumann | |
| 7,281,168 B1 | 10/2007 | Coates | |
| 7,404,000 B2 | 7/2008 | Lolayekar | |
| 7,694,065 B2 | 4/2010 | Petev | |
| 7,975,018 B2 | 7/2011 | Unrau | |
| 8,180,801 B2 | 5/2012 | Zhang | |
| 8,423,606 B1 | 4/2013 | Streeter | |
| 8,489,549 B2 | 7/2013 | Guarraci | |
| 8,527,549 B2 | 9/2013 | Cidon | |
| 8,548,957 B2 | 10/2013 | Guarraci | |
| 8,634,456 B2 | 1/2014 | Chen | |
| 8,826,332 B2 | 9/2014 | Marshall | |
| 8,849,761 B2 | 9/2014 | Prahlad | |
| 8,886,704 B2 | 11/2014 | Busey | |
| 8,886,894 B2 | 11/2014 | Adi-Tabatabai | |
| 8,948,258 B2 | 2/2015 | Chen | |
| 8,954,596 B2 | 2/2015 | Ronca | |
| 9,015,470 B2 | 4/2015 | Losev | |
| 9,087,066 B2 | 7/2015 | Acharya | |
| 9,191,725 B2 | 11/2015 | Schmidt | |
| 9,210,085 B2 | 12/2015 | Harrison | |
| 9,253,166 B2* | 2/2016 | Gauda | G06F 21/6218 |
| 9,288,510 B1 | 3/2016 | Yang | |
| 9,294,530 B2 | 3/2016 | McCormick | |
| 9,307,258 B2 | 4/2016 | Macinnis | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,432,704 B2 | 8/2016 | Mutton | |
| 9,444,695 B2 | 9/2016 | Dutta | |
| 9,501,212 B2 | 11/2016 | Marshall | |
| 9,544,348 B2 | 1/2017 | Devereaux | |
| 9,621,613 B1 | 4/2017 | Huang | |
| 9,628,268 B2 | 4/2017 | Kiang et al. | |
| 9,632,814 B2 | 4/2017 | Bonilla | |
| 9,715,428 B1 | 7/2017 | Morshed | |
| 9,756,022 B2 | 9/2017 | Amiri et al. | |
| 9,788,015 B2 | 10/2017 | Chen | |
| 9,811,532 B2 | 11/2017 | Parkison et al. | |
| 9,852,361 B1 | 12/2017 | Prasad | |
| 9,900,608 B2 | 2/2018 | Coudurier | |
| 9,930,365 B2 | 3/2018 | Chen | |
| 9,940,241 B1 | 4/2018 | Mehrotra | |
| 9,973,564 B2 | 5/2018 | Dong | |
| 10,033,787 B2 | 7/2018 | Ronca | |
| 10,063,872 B2 | 8/2018 | Coward | |
| 2004/0107319 A1 | 6/2004 | D'Orto | |
| 2007/0076626 A1 | 4/2007 | Wise | |
| 2007/0250476 A1* | 10/2007 | Krasnik | G06F 16/2246 |
| 2008/0098237 A1 | 4/2008 | Dung | |
| 2008/0267221 A1* | 10/2008 | Ozzie | G06F 16/275 370/503 |
| 2009/0016445 A1 | 1/2009 | Gao | |
| 2010/0211690 A1 | 8/2010 | Pakzad | |
| 2010/0250867 A1 | 9/2010 | Bettger | |
| 2010/0268840 A1 | 10/2010 | Hiie | |
| 2010/0332479 A1 | 12/2010 | Prahlad | |
| 2011/0066668 A1* | 3/2011 | Guarraci | G06F 16/27 707/831 |
| 2011/0096828 A1 | 4/2011 | Chen | |
| 2011/0179167 A1 | 7/2011 | Tanimoto | |
| 2011/0185292 A1 | 7/2011 | Chawla | |
| 2011/0194613 A1 | 8/2011 | Chen | |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2011/0305273 A1 | 12/2011 | He | |
| 2011/0320733 A1 | 12/2011 | Sanford | |
| 2012/0016838 A1 | 1/2012 | Arai | |
| 2012/0023249 A1 | 1/2012 | Chen | |
| 2012/0158802 A1 | 6/2012 | Lakshmanan | |
| 2012/0278497 A1 | 11/2012 | Hsu | |
| 2012/0331089 A1 | 12/2012 | Vonog | |
| 2013/0013803 A1 | 1/2013 | Bichot | |
| 2013/0110961 A1 | 5/2013 | Jadhav | |
| 2013/0117418 A1 | 5/2013 | Mutton | |
| 2013/0138810 A1 | 5/2013 | Binyamin | |
| 2013/0223509 A1 | 8/2013 | Tweedale | |
| 2013/0238785 A1 | 9/2013 | Hawk | |
| 2013/0276048 A1 | 10/2013 | Krasic | |
| 2013/0318198 A1 | 11/2013 | Zuk | |

(56) References Cited

U.S. PATENT DOCUMENTS

| | | | |
|---|---|---|---|
| 2013/0339470 A1 | 12/2013 | Jeswani | |
| 2014/0006354 A1 | 1/2014 | Parkison et al. | |
| 2014/0006465 A1 | 1/2014 | Davis | |
| 2014/0019844 A1* | 1/2014 | Rakow | G06F 3/038 715/234 |
| 2014/0108792 A1 | 4/2014 | Borzycki | |
| 2014/0118379 A1 | 5/2014 | Hakura | |
| 2014/0119457 A1 | 5/2014 | Macinnis | |
| 2014/0140417 A1 | 5/2014 | Shaffer | |
| 2014/0149591 A1 | 5/2014 | Bhattacharya | |
| 2014/0149783 A1 | 5/2014 | Georgiev | |
| 2014/0153909 A1 | 6/2014 | Macinnis | |
| 2014/0177733 A1 | 6/2014 | Coudurier | |
| 2014/0201141 A1 | 7/2014 | Vibhor et al. | |
| 2014/0269932 A1 | 9/2014 | Su | |
| 2014/0281009 A1 | 9/2014 | Moorthy | |
| 2014/0282771 A1 | 9/2014 | Tumuluru | |
| 2014/0324929 A1* | 10/2014 | Mason, Jr. | G06F 16/1774 707/827 |
| 2014/0351455 A1 | 11/2014 | McCormick | |
| 2014/0359465 A1 | 12/2014 | Litan Sever | |
| 2014/0379647 A1 | 12/2014 | Smith | |
| 2014/0380376 A1 | 12/2014 | Schmidt | |
| 2015/0039726 A1 | 2/2015 | Hoffert | |
| 2015/0067109 A1 | 3/2015 | Tang | |
| 2015/0067753 A1 | 3/2015 | Shemesh | |
| 2015/0220561 A1 | 8/2015 | Goetz | |
| 2015/0227602 A1 | 8/2015 | Ramu | |
| 2015/0242436 A1 | 8/2015 | Bodin | |
| 2015/0372939 A1 | 12/2015 | Redler, IV | |
| 2016/0014095 A1 | 1/2016 | Strayer | |
| 2016/0065364 A1 | 3/2016 | Amiri et al. | |
| 2016/0103851 A1 | 4/2016 | Dimitrov | |
| 2016/0119657 A1 | 4/2016 | Sun | |
| 2016/0323351 A1 | 4/2016 | Lurhra et al. | |
| 2016/0156948 A1 | 6/2016 | Yang | |
| 2016/0173900 A1 | 6/2016 | Lee | |
| 2016/0212440 A1 | 7/2016 | Coudurier | |
| 2016/0234282 A1 | 8/2016 | Lederer | |
| 2016/0241898 A1 | 8/2016 | Korz | |
| 2016/0321287 A1 | 11/2016 | Luthra et al. | |
| 2016/0321288 A1 | 11/2016 | Malhotra et al. | |
| 2016/0321291 A1 | 11/2016 | Malhotra et al. | |
| 2016/0321311 A1 | 11/2016 | Tallamraju et al. | |
| 2016/0323358 A1 | 11/2016 | Malhotra et al. | |
| 2017/0134344 A1 | 5/2017 | Wu | |
| 2017/0141921 A1 | 5/2017 | Berger | |
| 2018/0098083 A1 | 4/2018 | Mcallister | |

OTHER PUBLICATIONS

"REST Docs | Bitcasa Developer Center", URL: https://developer.bitcasa.com/docs/rest/, Sep. 2015, Accessed on Jan. 15, 2016.

"Data deduplication", Wikipedia, URL: https://en.wikipedia.org/wiki/Data_deduplication, Mar. 6, 2016, Accessed on Apr. 10, 2016.

Chiu, David, et al., "Elastic Cloud Caches for Accelerating Service-Oriented Computations", SC '10, New Orleans, LA, Nov. 13-19, 2010, 11 pages.

Chun, Byung-Gon, et al., "CloneCloud: Elastic Execution between Mobile Device and Cloud", EuroSys '11, Salzburg, Austria, Apr. 10-13, 2011, pp. 301-314.

Final Office Action dated Feb. 6, 2019 for U.S. Appl. No. 15/140,357.

Final Office Action dated Oct. 30, 2018 for U.S. Appl. No. 15/140,270.

Haining, Theodore R., et al., "Management Policies for Non-Volatile Write Caches", PCCC 1999, Scottsdale, AZ, Feb. 12, 1999, pp. 321-328.

Kim, Hwanju, et al., "XHive: Efficient Cooperative Caching for Virtual Machines", IEEE Transactions on Computers, vol. 60, No. 1, Jan. 2011, pp. 106-119.

Kim, Hyeon Gyu, et al., "Time-slide window join over data streams", Journal of Intelligent Information Streams, vol. 43, Issue 2, Oct. 2014, pp. 323-347.

Li, Jin, et al., "AdaptWID: An Adaptive, Memory-Efficient Window Aggregation Implementation", IEEE Internet Computing, vol. 12, Issue 6, Nov.-Dec. 2008, pp. 22-29.

Li, Jin, et al., "Semantics and Evaluation Techniques for Window Aggregates in Data Streams", ACM SIGMOD 2005, Baltimore, MD, Jun. 14-16, 2005, pp. 311-322.

Mancuso, Renato, et al., "Real-Time Cache Management Framework for Multi-core Architectures", RTAS 2013, Philadelphia, PA, Apr. 9-11, 2013, pp. 45-54.

Mao, Huajian, et al., "Wukong: A cloud-oriented file service for mobile Internet devices", Journal of Parallel and Distributed Computing, vol. 72, Issue 2, Feb. 2012, pp. 171-184.

Non-Final Office Action dated Apr. 18, 2018 for U.S. Appl. No. 15/140,310.

Non-Final Office Action dated May 14, 2018 for U.S. Appl. No. 15/140,270.

Non-Final Office Action dated Jun. 3, 2019 for U.S. Appl. No. 15/140,357.

Non-Final Office Action dated Nov. 9, 2018 for U.S. Appl. No. 15/140,357.

Notice of Allowance dated Feb. 21, 2018 for U.S. Appl. No. 15/140,330.

Notice of Allowance dated Mar. 14, 2018 for U.S. Appl. No. 15/140,248.

Notice of Allowance dated Apr. 5, 2019 for U.S. Appl. No. 15/140,270.

Notice of Allowance dated Apr. 5, 2019 for U.S. Appl. No. 16/024,748.

Notice of Allowance dated Jun. 15, 2018 for U.S. Appl. No. 15/140,179.

Notice of Allowance dated Sep. 6, 2018 for U.S. Appl. No. 15/140,310.

Patroumpas, Kostas, et al., "Maintaining consistent results of continuous queries under diverse window specifications", Information Systems, vol. 36, Issue 1, Mar. 2011, pp. 42-61.

Patroumpas, Kostas, et al., "Window Specification over Data Streams", EDBT 2006 Workshops, LNCS 4254, © IFIP International Federation for Information Processing© 2006, pp. 445-464.

Peng, Chunyi, et al., "VON: Virtual Machine Image Distribution Network for Cloud Data Centers", INFOCOM 2012, Orlando, FL, Mar. 25-30, 2012, pp. 181-189.

Saxena, Moh it, et al., "Flash Tier: A Lightweight, Consistent and Durable Storage Cache", EuroSys '12, Bern, Switzerland, Apr. 10-13, 2012, pp. 267-280.

Stefanov, Emil, et al., "Iris: A Scalable Cloud File System with Efficient Integrity Checks", ACSAC '12, Orlando, FL, Dec. 3-7, 2012, pp. 229-238.

Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.

Zhou, Yuanyuan, et al., "Second-Level Buffer Cache Management", IEEE Transactions on Parallel and Distributed Systems, vol. 15, No. 6, Jun. 2004, pp. 505-519.

Final Office Action dated Jun. 30, 2020 for U.S. Appl. No. 15/140,357.

Notice of Allowance dated Jun. 30, 2020 for U.S. Appl. No. 16/174,202.

Non-Final Office Action dated Feb. 5, 2020 for U.S. Appl. No. 15/140,357.

Maxim Levkov. "Understanding the MPEG-4 Movie Atom", Adobe Developer Connection, 5 pages. (Year: 2010).

Notice of Allowance dated Oct. 21, 2020 for U.S. Appl. No. 16/174,202.

Final Office Action dated Oct. 9, 2020 for U.S. Appl. No. 15/140,357.

Notice of Allowance dated Aug. 7, 2020 for U.S. Appl. No. 16/036,735.

Juve, Gideon, and Ewa Deelman. "Automating application deployment in infrastructure clouds." *2011 IEEE Third International Conference on Cloud Computing Technology and Science*. IEEE, 2011.

* cited by examiner

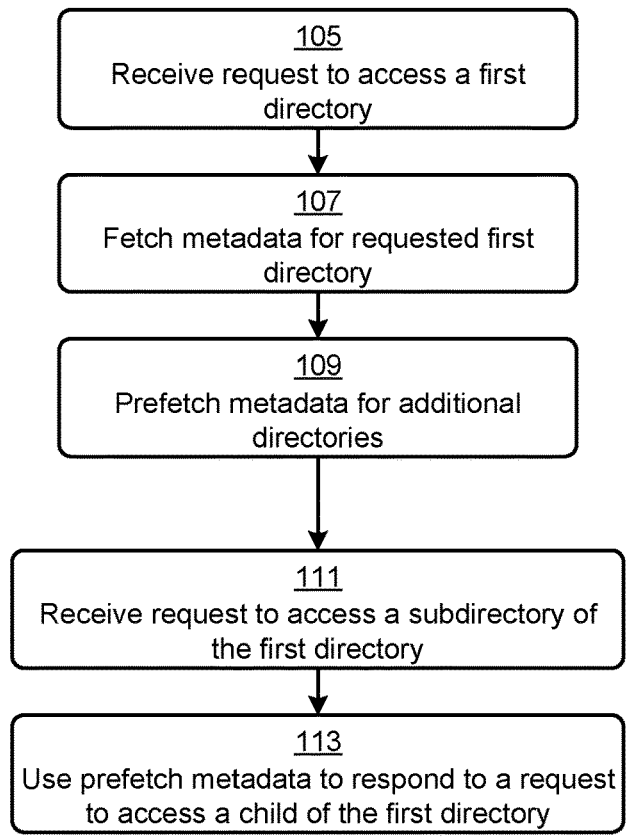
FIG. 1A1

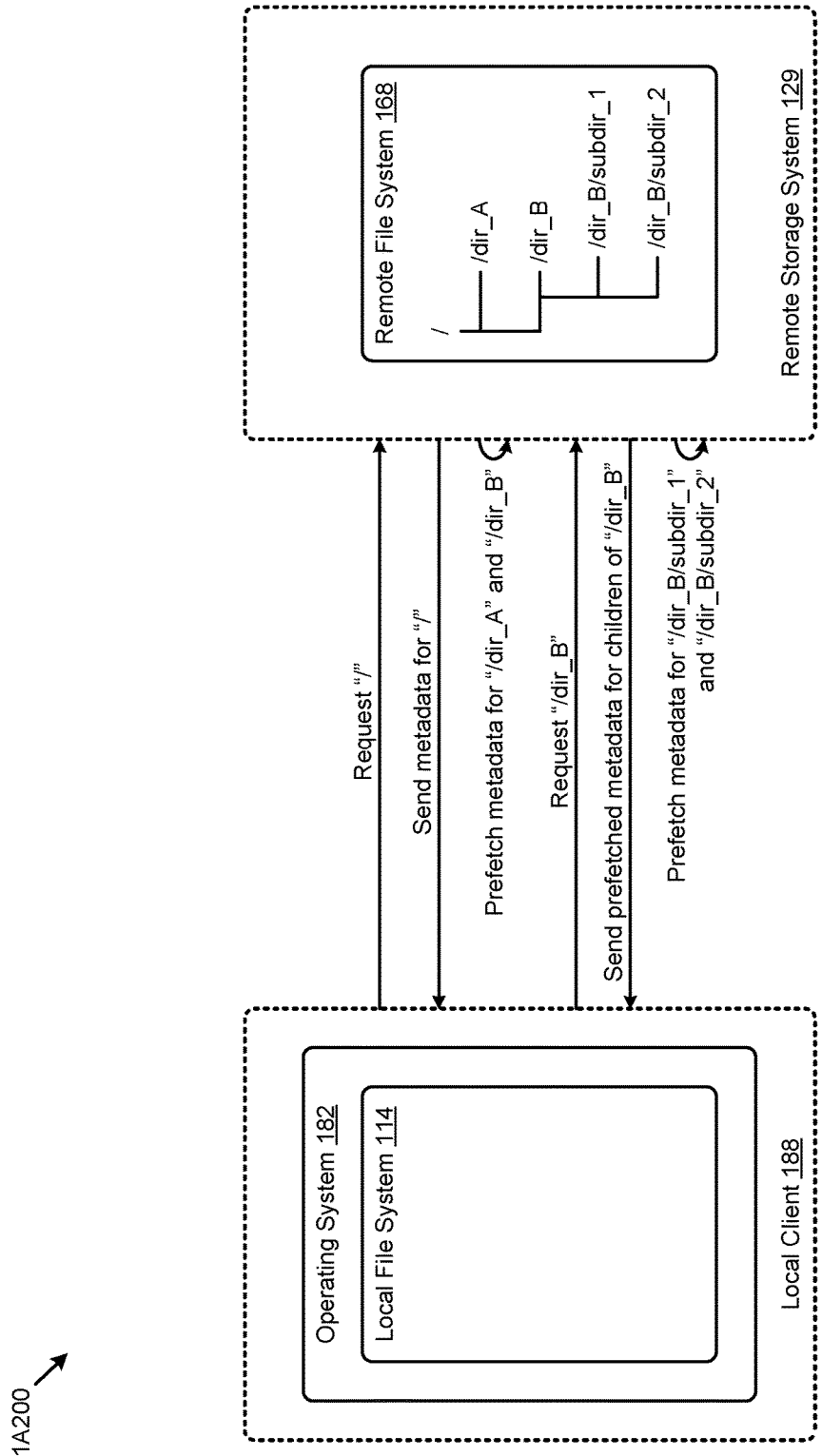
FIG. 1A2

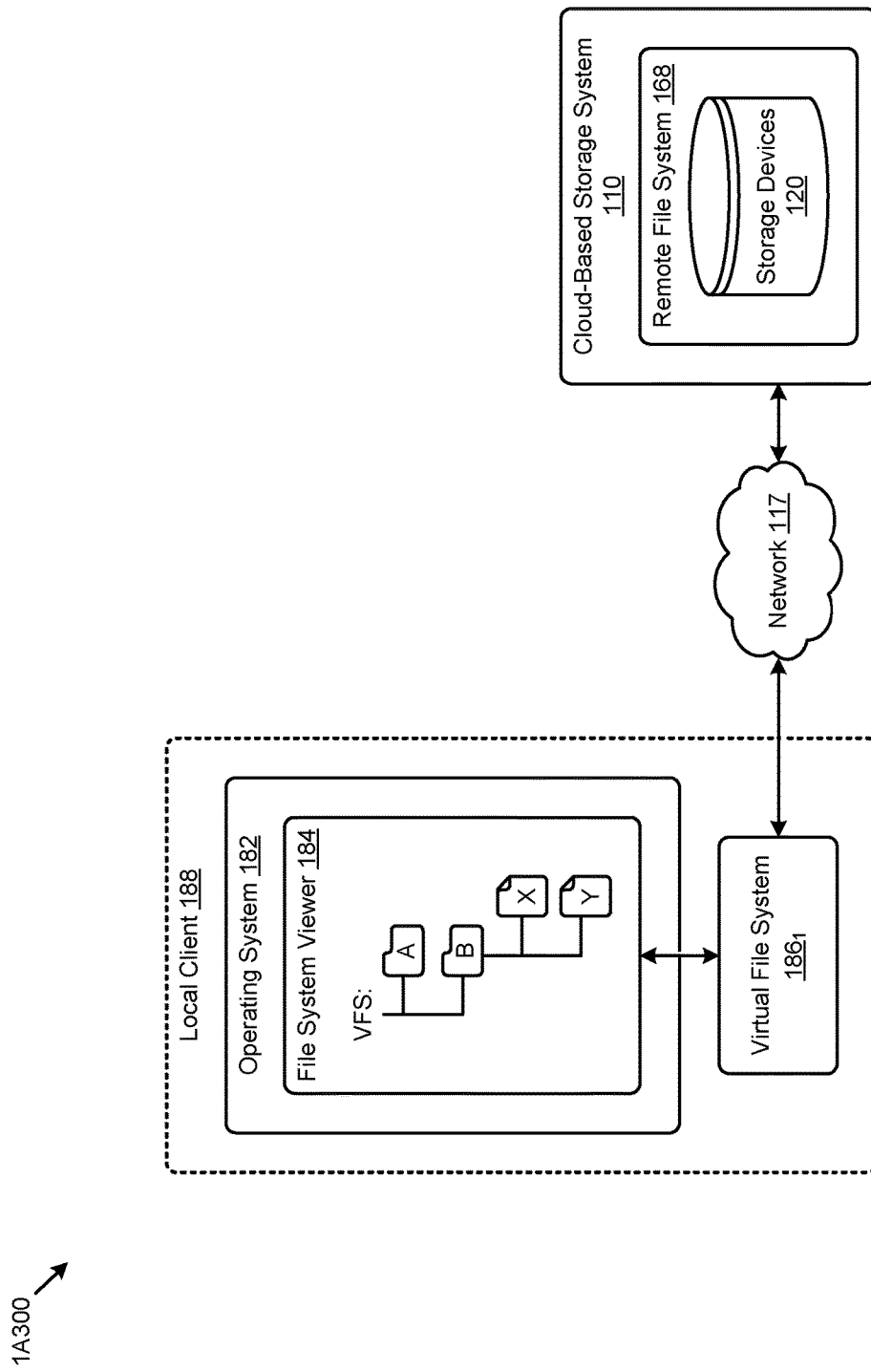
FIG. 1A3

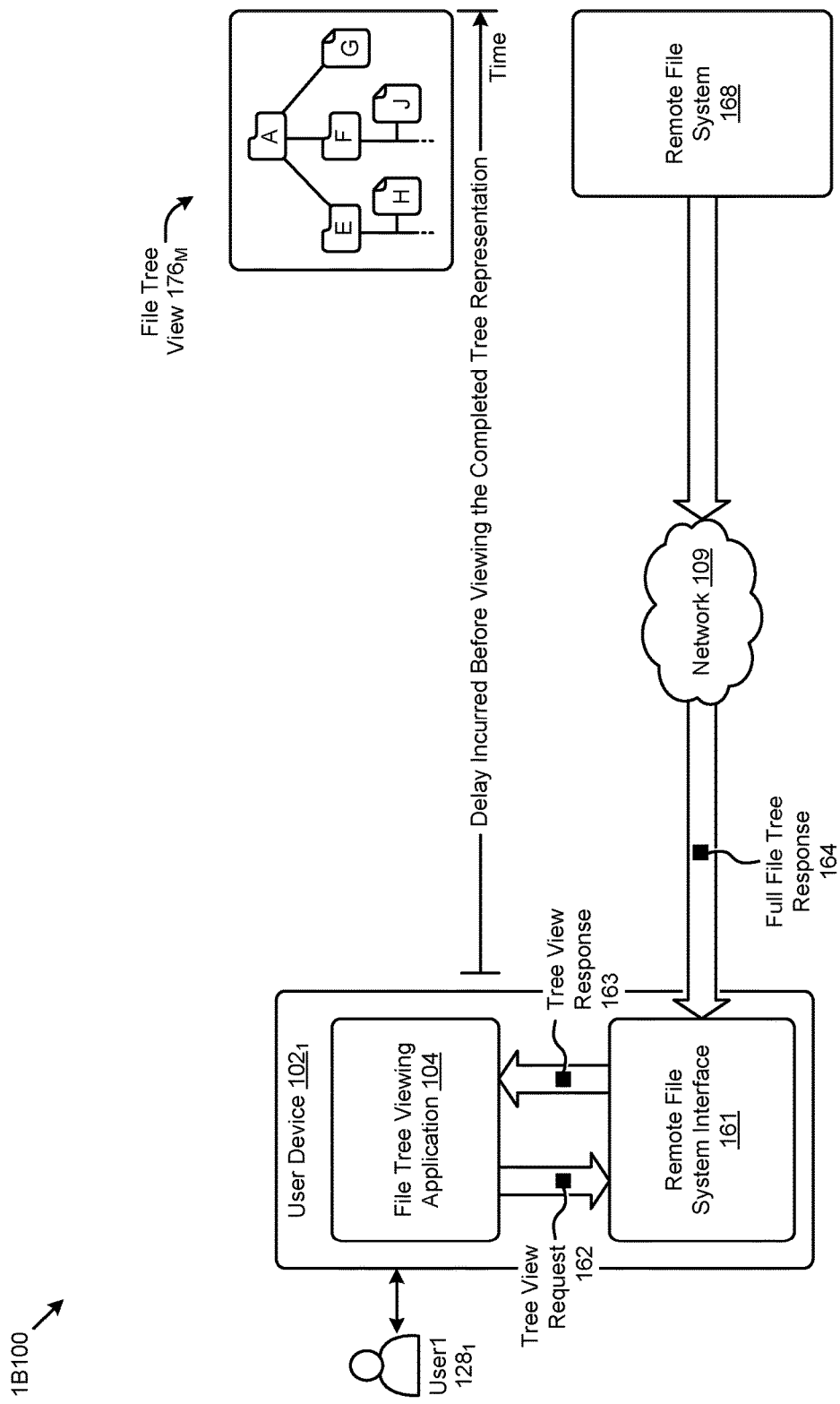
FIG. 1B1

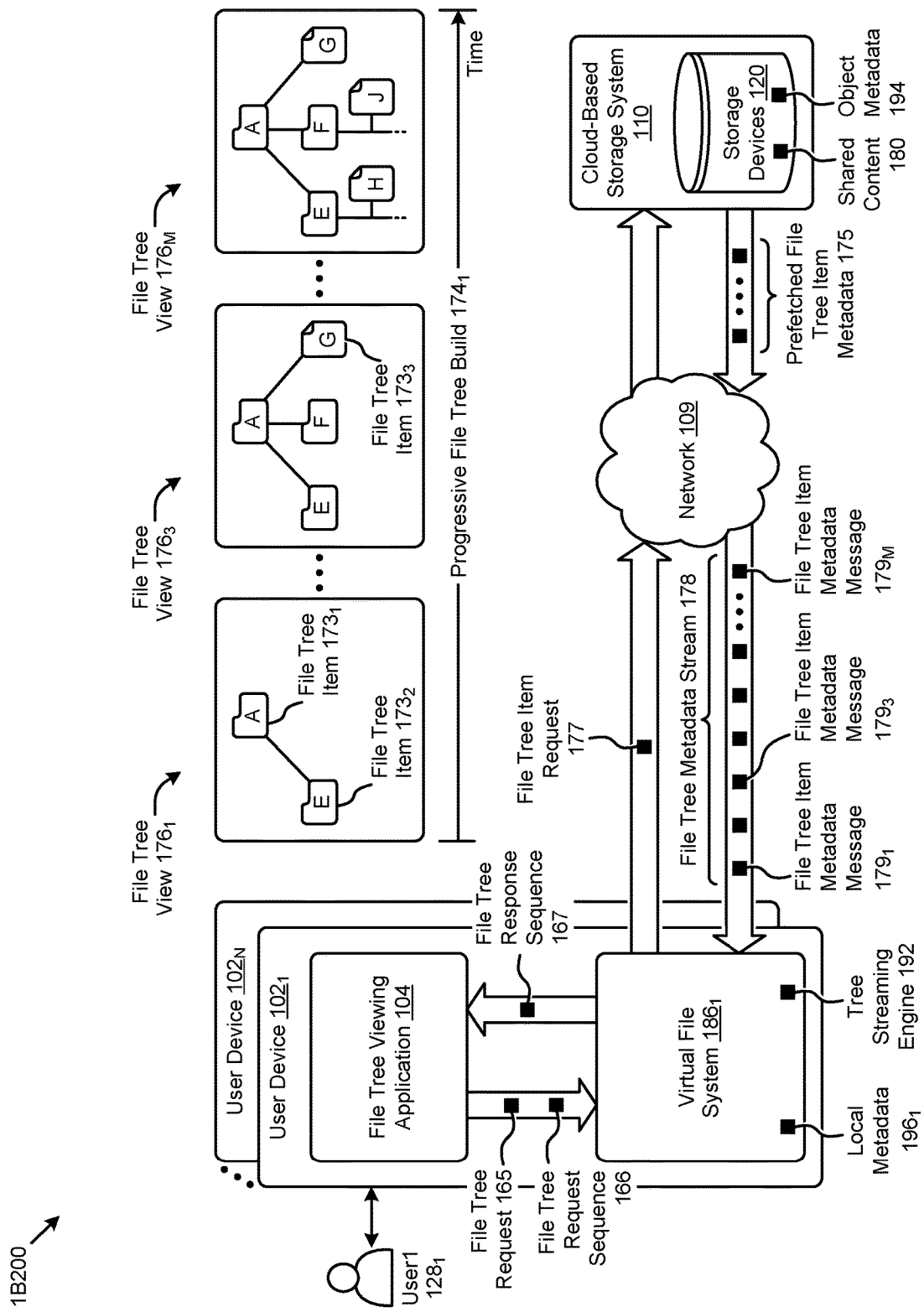
FIG. 1B2

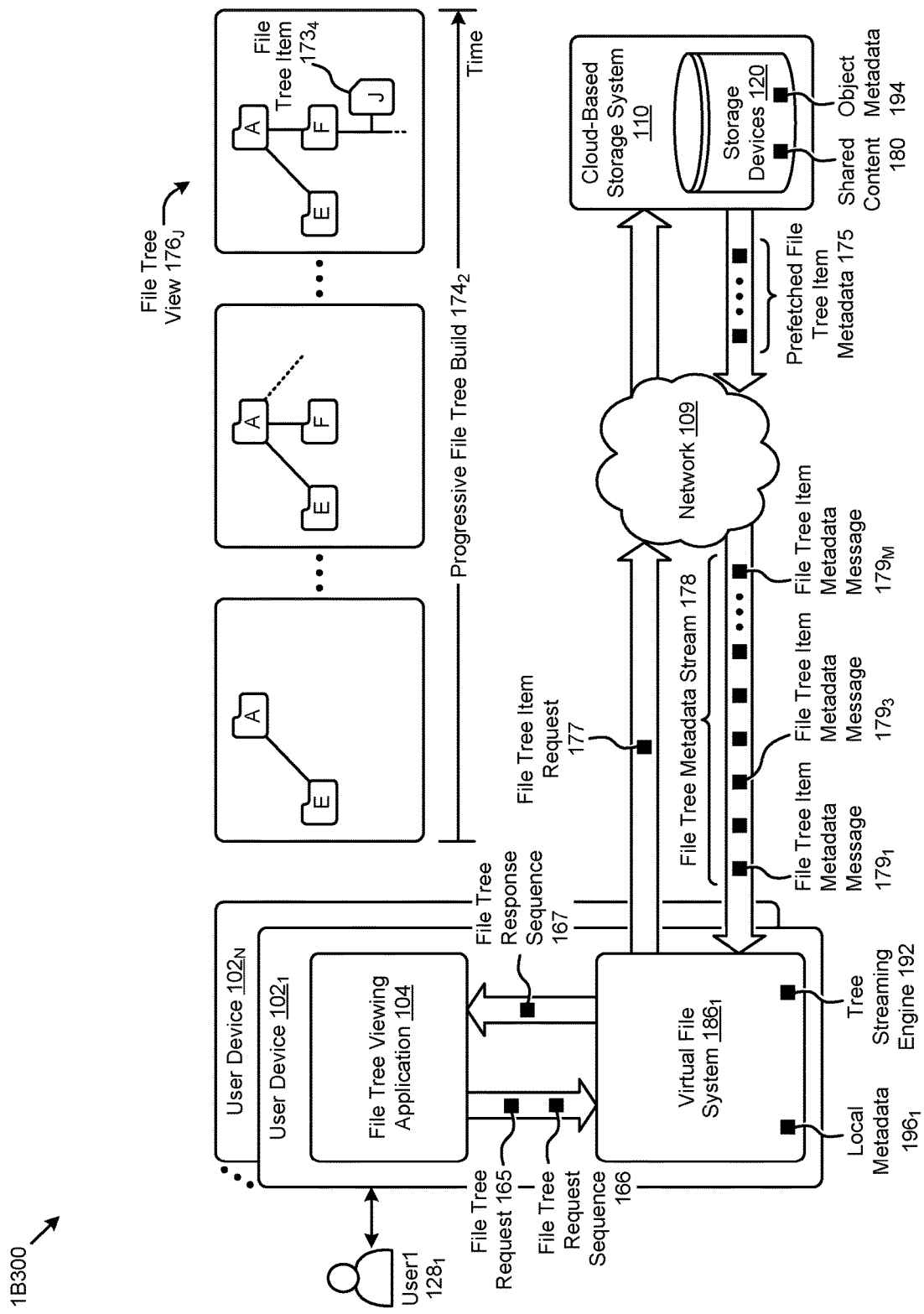
FIG. 1B3

FILE TREE STREAMING IN A VIRTUAL FILE SYSTEM FOR CLOUD-BASED SHARED CONTENT

RELATED APPLICATIONS

The present application claims the benefit of priority to U.S. Provisional Patent Application Ser. No. 62/154,658 titled, "METHOD MECHANISM TO IMPLEMENT A VIRTUAL FILE SYSTEM FROM REMOTE CLOUD STORAGE", filed Apr. 29, 2015, which is hereby incorporated by reference in its entirety The present application is related to U.S. Patent Application titled, "A VIRTUAL FILE SYSTEM FOR CLOUD-BASED SHARED CONTENT" filed on even date herewith; and the present application is related to U.S. Patent Application titled, "OPERATION MAPPING IN A VIRTUAL FILE SYSTEM FOR CLOUD-BASED SHARED CONTENT" filed on even date herewith; and the present application is related to U.S. Patent Application titled, "MULTI-REGIME CACHING IN A VIRTUAL FILE SYSTEM FOR CLOUD-BASED SHARED CONTENT" filed on even date herewith; and the present application is related to U.S. Patent Application titled, "FILE-AGNOSTIC DATA DOWNLOADING IN A VIRTUAL FILE SYSTEM FOR CLOUD-BASED SHARED CONTENT" filed on even date herewith; and the present application is related to U.S. Patent Application titled, "SECURE CLOUD-BASED SHARED CONTENT" filed on even date herewith; all of which are hereby incorporated by reference in their entirety.

FIELD

This disclosure relates to managing content in a cloud-based service platform, and more particularly to techniques for file tree streaming in a virtual file system for a cloud-based environment.

BACKGROUND

Emergence of cloud-based content management services and platforms continue to impact the way personal and corporate electronically stored information objects (e.g., files, images, videos, etc.) are stored, and has also impacted the way such personal and corporate content is shared and managed. One benefit of using such cloud-based platforms is the ability to securely share large volumes of content among trusted collaborators on a variety of user devices such as mobile phones, tablets, laptop computers, desktop computers, and/or other devices. A large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Such access can facilitate multiple users (e.g., collaborators) to access certain shared objects for various collaborative purposes (e.g., collaborative co-development, collaborative audience feedback, etc.). In some cases, users can discover (e.g., find, explore, browse, etc.) such shared objects using a visual representation of the objects.

One such visual representation is a file tree. Such file trees can comprise linked nodes representing the objects (e.g., files, etc.) and/or logical collections of the objects (e.g., folders, directories, etc.). For such large and highly collaborative environments, the number of objects in a given folder, and/or the number of collaborators of such objects and/or folders, can commensurately increase. For example, a certain object sought by a collaborator might be in a file tree among thousands of other objects under a root directory and/or be logically nested multiple hierarchical logical levels below a top level folder and/or root directory.

Unfortunately, legacy techniques for rendering a local device representation of a file tree corresponding to shared content stored on a cloud-based storage system can incur long latencies associated with displaying the file tree to the user. Specifically, certain legacy approaches might process a request (e.g., readdir( ) command) to view a certain folder and its contents from a cloud-based storage system on a local user device by collecting all the information necessary to render a full file tree pertaining to the folder before performing any of the operations pertaining to rendering the file tree at the user device. With such approaches, the aforementioned large and/or deep folder structures can result in an unsatisfactorily long latency before display of the file tree on the local user device. In other cases, the user may not have needed the full file tree in order to perform later invoked operations. For example, the user might be seeking a fileG in a folderA that comprises 1,000 objects and 12 hierarchical levels, but the fileG is a direct child of the parent folderA. In this case, using the foregoing legacy approaches, the user would have to wait until the entire 1,000 items in the subject file tree are ready to be rendered, even though the user might only need just the few hierarchical items to gain access to the fileG. Such issues with legacy approaches can impact collaboration efficiency and/or effectiveness when accessing shared content in a cloud-based storage system from local user devices.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for file tree streaming in a virtual file system for a highly collaborative cloud-based environment, which techniques advance the relevant technologies to address technological issues with legacy approaches. More specifically, the present disclosure provides a detailed description of techniques used in systems, methods, and in computer program products for file tree streaming in a virtual file system for a highly collaborative cloud-based environment. Certain embodiments are directed to technological solutions for implementing a virtual file system (VFS) on a local device to progressively build a local file tree view of shared content stored on a cloud-based storage system using a metadata stream from the cloud-based storage system, which embodiments advance the relevant technical fields as well as advancing peripheral technical fields.

In one aspect, a server in a cloud-based environment interfaces with one or more storage devices to provide storage of shared content accessible by two or more user devices. A file tree request to view the file directory or file folder of a particular sought after item is issued from an application operating on one of the user devices. The user device commences to receive a plurality of file tree item metadata messages in a file tree metadata stream. The application closes the file tree metadata stream after receiving the portion of the file tree that pertains to the particular item and before receiving the entirety of the metadata pertaining to all of the file tree metadata of all of the items in the directory or folder that contains the particular sought after item. Additional metadata pertaining to all of the file tree metadata of the entirety of the file directory or file folder may be prefetched by the server. When a second user device issues the same file tree request to view the file directory or file folder of a different particular sought after item the previously generated plurality of file tree item metadata messages for the file tree metadata stream are delivered to the second user device.

The disclosed embodiments modify and improve over legacy approaches. In particular, the herein-disclosed techniques provide technical solutions that address the technical problems attendant to delays in rendering a local device representation of a file tree corresponding to shared content stored on a cloud-based storage system. Such technical solutions serve to reduce the demand for computer memory, reduce the demand for networking bandwidth, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 1A1 shows a flowchart of an improved approach that can be taken to implement metadata prefetching, according to some embodiments.

FIG. 1A2 and FIG. 1A3 present logical system views of a user device interacting with a cloud-based platform, according to some embodiments.

FIG. 1B1 presents a full file tree view technique.

FIG. 1B2 and FIG. 1B3 present file tree streaming techniques facilitated by a virtual file system in a highly collaborative cloud-based environment, according to some embodiments.

FIG. 2 presents an interconnection diagram showing communications between system components that cooperate to implement file tree streaming in a virtual file system, according to an embodiment.

FIG. 3 depicts an environment that supports a communication protocol pertaining to file tree streaming implemented using components of a virtual file system in a highly collaborative cloud-based environment, according to an embodiment.

DETAILED DESCRIPTION

Figure 1C:
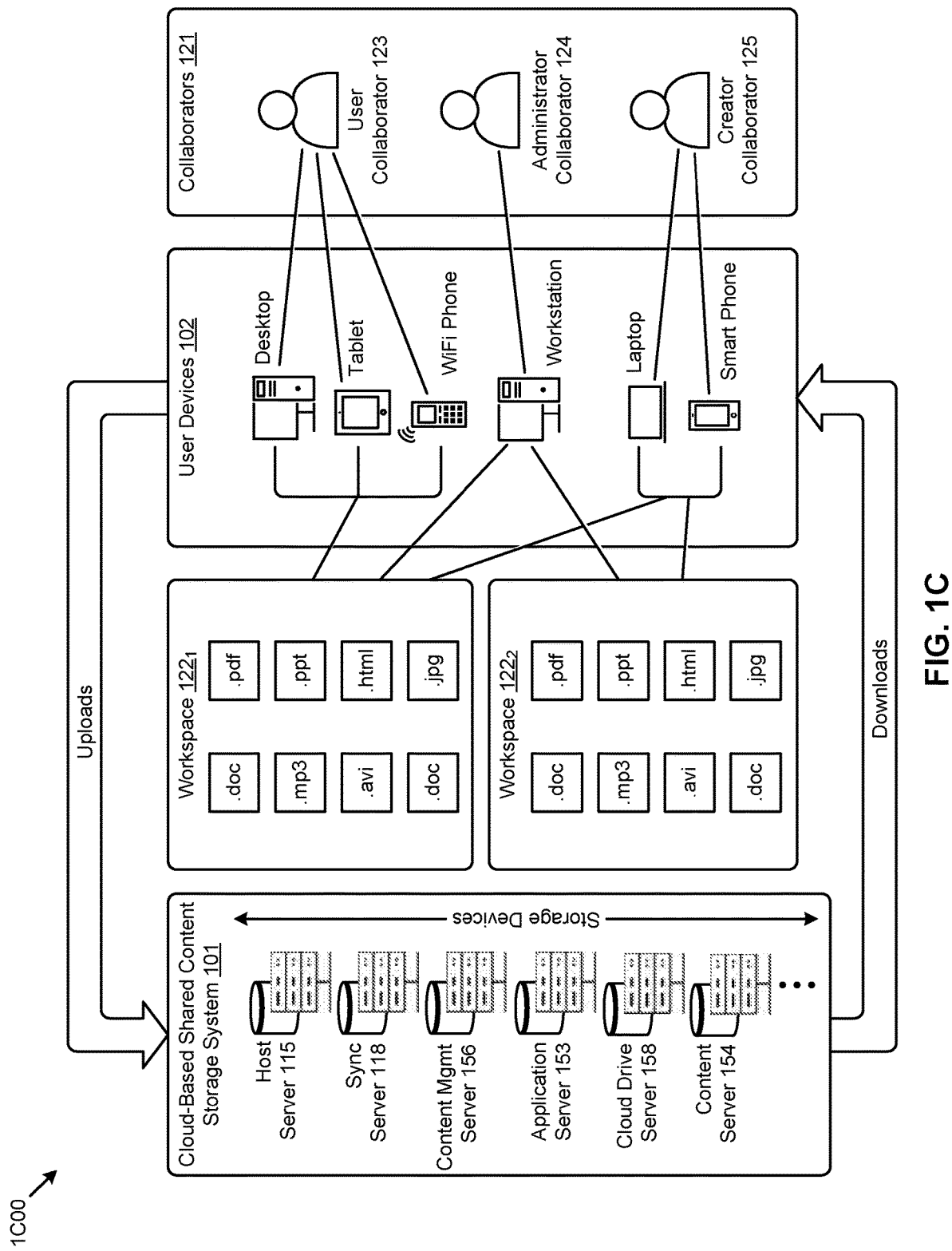
FIG. 1C depicts a cloud-based environment including a collaborative cloud-based shared content management platform that facilitates file tree streaming in a virtual file system, according to an embodiment.

Some embodiments of the present disclosure address the problem of delays in rendering a local device representation of a file tree corresponding to shared content stored on a cloud-based storage system, and some embodiments are directed to approaches for implementing a virtual file system (VFS) on a local device to progressively build a local file tree view of shared content stored on a cloud-based storage system using a metadata stream from the cloud-based storage system. The accompanying figures and discussions herein present example environments, systems, methods, and computer program products for file tree streaming in a virtual file system for a highly collaborative cloud-based environment.

Overview

Disclosed herein are techniques that implement a virtual file system (VFS) on a local device to progressively build a local file tree view of shared content stored on a cloud-based storage system using a metadata stream from the cloud-based storage system. Specifically, in some embodiments, a tree streaming engine in the VFS can receive a certain file tree view requests from an application on a local user device to generate respective sequences of file tree requests and responses that produce a stream of file tree metadata from the cloud-based storage system. The file tree metadata stream can be used to progressively build the requested file tree in the application. A low latency between the initiating file tree view request from the application and the commencing of the file tree rendering can be facilitated by certain embodiments of the herein disclosed techniques.

A file tree can comprise all or a portion of a folder or directory of a file system, or a file tree can comprise all or a portion of directory metadata of a file system. The tree might be relatively deep (e.g., comprising a directory hierarchy having many hierarchical levels) or the tree might be relatively flat (e.g., with few levels of hierarchy). Any hierarchical level of a file tree can subsume many objects, including many files and/or many subfolders. An object can be any sort of data or metadata that can be stored. Strictly as examples, an object can be a data file, a media file, a configuration file, or a file pointer (e.g., a link or junction or symbolic link). Any object can be identified by a name, which name or its metadata might also comprise a version identifier.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1, shows a flowchart 1A100 of an improved approach that can be taken to implement metadata prefetching. At step 105 a request is received that will result in the fetching of metadata for the file system. For example, this may involve a local file system requesting to access a given directory (e.g., when the user seeks to navigate to a first directory). At step 107, metadata is fetched for the requested directory. Without requiring an explicit call to download additional metadata, at step 109, the process automatically prefetches additional metadata for additional directories in the file system. The prefetching operates on the anticipation that if a given directory is opened, then there is a good chance that the subdirectories for that directory will also be opened in the near future. Therefore, prospectively, the download workers will prefetch the metadata for those additional directories. In some embodiments, metadata for two additional levels of directories/folders will be prefetched. At step 111, a further request to access a directory. The request might follow the aforementioned anticipation such that the further request to access a directory is a requested to access the subdirectory as was anticipated. At step 113, the prefetched metadata is used to respond to a request to access the anticipated directory (e.g., a child of the first directory). FIG. 1A2 illustrate this process as used between a local client and a remote storage system.

FIG. 1A2 depicts an environment 1A200 including a local client 188 having an operating system 182 that accesses a local file system 114. The local file system might correspond to a virtual file system intended to be populated with data from a cloud-based storage system (e.g., the shown remote storage system 129). In particular, the local file system 114 corresponds to a portion of directories and objects stored at the remote file system 168. A request that is made from the local client 188 to the remote storage system 129 for metadata pertaining to the "/" directory. Any suitable action at the local client 188 may have resulted in the request for this metadata. For example, an application and/or user may have sought to navigate to that directory. Since the metadata for that directory does not yet exist at the local client 188, that metadata needs to be retrieved from the remote storage system 129. The requested metadata for directory "/" is sent from the remote storage system 129 to the local client 188. In addition, metadata for additional directories can also be prefetched. For example, and as illustrated, metadata for directories "/dir_A" and "/dir_B" are prefetched, despite no explicit request for these items of metadata from the local client 188. This is because it is deemed likely that the request for metadata for "/" would have been followed up by requests for metadata about these additional directories, and hence it is much more efficient to fetch these additional items of metadata at the same time that metadata is fetched for "/". Metadata for an additional layer of the directory tree is prefetched. It is noted that any appropriate quantity of additional metadata can be prefetched within the scope of the invention, and therefore the invention is not limited to any specific quantity of data or hierarchical levels for prefetching. Indeed, some embodiments will build out two additional hierarchical levels when performing prefetching. In some cases prefetching is performed over a hierarchy following a breadth-first traversal. In some cases prefetching is performed over a hierarchy following a depth-first traversal.

In some embodiments, the fetch of metadata for a given level of the directory structure will routinely also fetch the metadata contents of that directory. For example, the fetch of metadata for "I" shown in FIG. 1A2 will also fetch the metadata for "/dir_A" and "/dir_B". In this situation, the prefetch operations will fetch the sub-children metadata of those child directories that have already been retrieved. For example, this would cause the prefetching actions to retrieve the metadata for "/dir_B/subdir_1" and "/dir_B/subdir_2".

Any suitable prioritization may be applied to the prefetching activities. For example, some embodiments will prefetch metadata for higher hierarchical levels before prefetching lower hierarchical levels.

In an alternate embodiment, a specific call for a given portion of the directory tree will cause a targeted prefetching for additional levels of that targeted subtree, even before prefetching higher hierarchical levels. As before, the environment include a local client 188 having an operating system 182 that accesses a local file system 114. The file system corresponds to a file system intended to be populated with data from a remote storage system 129. In particular, the local file system 114 corresponds to remote file system data. A request that is made from the local client 188 to the remote storage system 129 for metadata pertaining to the "/dir_B" directory. The requested metadata for directory "/dir_B" is sent from the remote storage system 129 to the local client 188. However, as shown in FIG. 1A2, prefetching in this example causes metadata for additional directories "/dir_B/subdir_1" and "/dir_B/subdir_2" to be prefetched. The metadata for these directories are prefetched instead of the metadata for "/dir_A", despite the fact that "/dir_A" is at a higher hierarchical level of the directory tree. In this case, the explicit request for "/dir_B" possibly means that user is currently more interested in the portion of the directory tree involving this directory, and hence it is therefore appropriate to continue prefetching through additional layers beneath this directory, rather than to prefetch through other parts of the directory tree.

Prefetching may also be performed on files or other objects within the file system. Any suitable approach can be taken to identify the additional metadata to prefetch. In one approach, the structure of the directory itself may determine the additional directories to prefetch. For example, assume that a directory exists in the file system that includes image objects. If one of the images is accessed, then it is likely that other images in that same directory will subsequently be accessed. As such, prefetching can be performed for some or all of the additional image files in that same directory.

As another example, past access patterns for directories or objects within a file system by a user may provide enough information to accurately predict the files that should be prefetched. For example, if a user routinely opens up a certain file after going to a certain directory, then it is possible that the file should be prefetched whenever the user navigates to that directory. As yet another example, machine learning can be applied to identify the files to prefetch. Clustering can be performed to determine the set of related files that should be grouped together, and hence prefetched when one of the files within a cluster is explicitly fetched.

Figure 3:
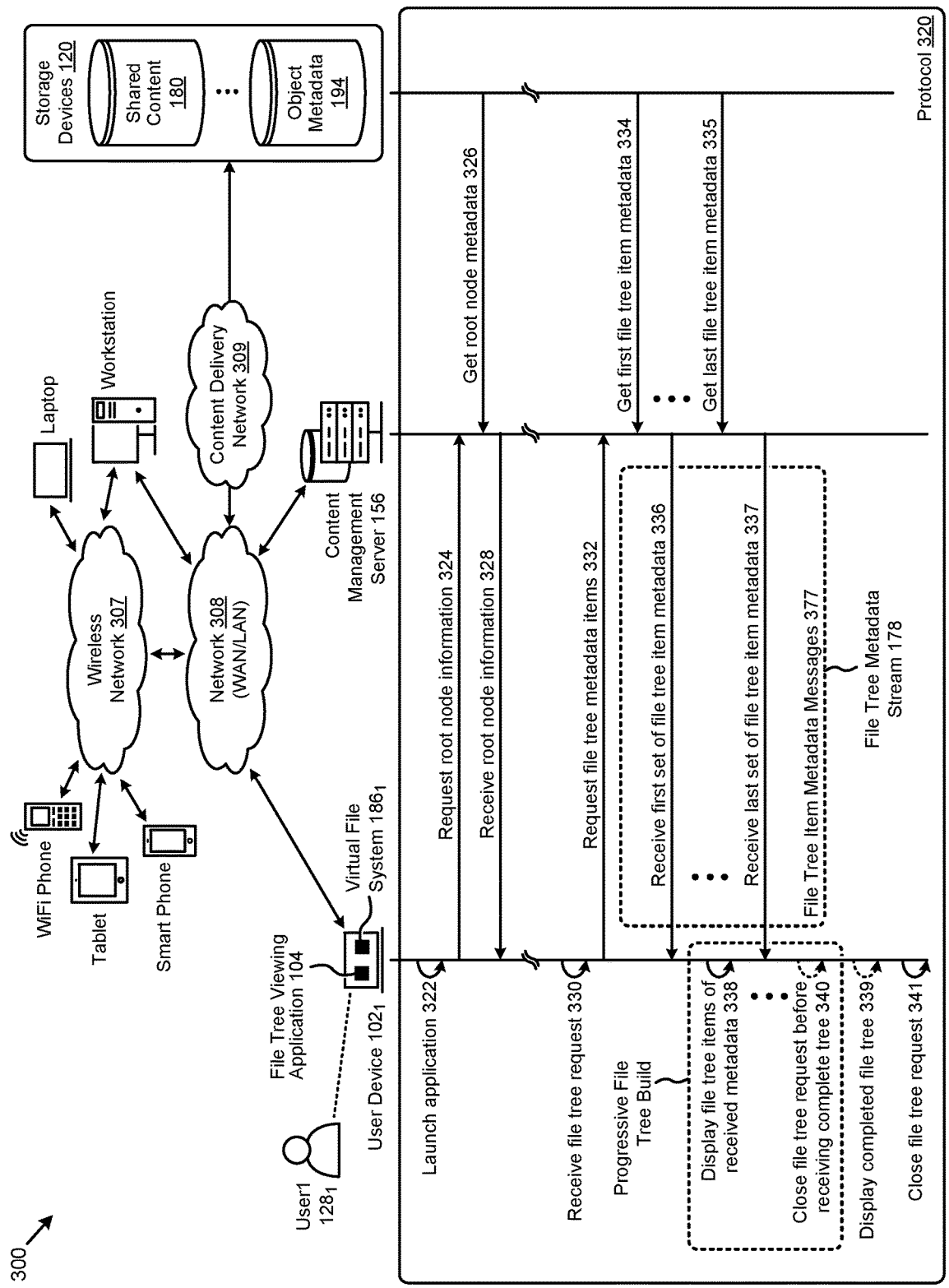

FIG. 1A3 presents a logical system view 1A300 of a virtual file system for cloud-based shared content. As an option, one or more variations of logical system view 1A300 or any aspect thereof may be implemented in the context of the architecture and functionality of the embodiments described herein. The logical system view 1A300 or any aspect thereof may be implemented in any environment.

As shown, the logical system view 1A300 comprises a local client 188 such as a user device (e.g., smart phone, laptop, etc.) that can have an operating system 182 that includes a file system viewer 184. A user device is a device that hosts an operating system or other executable code so as to serve as a local client when interfacing with a server.

As shown, the file system viewer 184 might render a visual representation of the certain objects, such as directories (e.g., folderA, folderB, etc.) and/or files (e.g., fileX, fileY, etc.), accessible at the local client 188. However, some or all of the objects (e.g., directories, files, etc.) accessible and/or visible within the file system viewer 184 might not be managed by the operating system 182. In some cases, the primary storage for such objects might be implemented across a network 117 by a cloud-based storage system 110. For example, certain instances of the cloud-based storage system 110 can be embodied as a cloud-based and/or SaaS-based implementation of a remote file system 168 having one or more instances of storage devices 120. The storage devices 120 can comprise any combination of hardware and software that can provide access to the data (e.g., content, objects, etc.) stored on the storage devices 120. For example, the storage devices 120 might be implemented as computer memory operatively managed by an operating system (OS), hard disk drives, solid state drives, networked attached storage, storage area networks, cloud-based storage, and/or any other type of storage facility and/or architecture that is capable of storing data. The data in the storage devices 120 can be implemented as any type of data objects and/or files.

One advantage of the cloud-based storage system 110 serving as the primary storage for certain objects accessible by the local client 188 can be the capability of the cloud-based storage system 110 to facilitate storage functionality as a service on a hosted platform. In such cases, each instance of the local client 188 (e.g., a user device associated with a user) that needs the service does not need to install and configure a respective instance of the cloud-based storage service components on a network (e.g., intranet) comprising the instance of the local client 188. Further, the host environment of the cloud-based storage system 110 can provide storage services to multiple users and/or can scale to service any number of users.

According to the herein disclosed techniques, a virtual file system $186_1$ can be delivered to the local client 188 to facilitate access to objects stored at the cloud-based storage system 110. As described herein, the virtual file system $186_1$ can address the problems attendant to delays in rendering a local device representation (e.g., at the local client 188) of a file tree corresponding to shared content stored on the cloud-based storage system 110. As an example, the virtual file system $186_1$ implementing the herein disclosed techniques can progressively build a local file tree view (e.g., in the file system viewer 184) of shared content stored on the cloud-based storage system 110 using a metadata stream from the cloud-based storage system 110. Some techniques for rendering a local device representation of a file tree corresponding to shared content stored on a cloud-based storage system can introduce long latencies associated with displaying the file tree to the user. Techniques are described in FIG. 1B1 for comparison to the techniques of FIG. 1B2 and for comparison to the techniques of FIG. 1B3.

FIG. 1B1, FIG. 1B2, and FIG. 1B3 present comparisons of file tree view techniques. A full file tree view technique 1B 100 is presented in FIG. 1B1. Other file tree viewing techniques are presented in FIG. 1B2 and in FIG. 1B3.

The full file tree view technique 1B 100 illustrates certain approaches to rendering a local device representation of a file tree corresponding to shared content stored on a cloud-based storage system. Specifically, and as shown, a remote file system interface 161 might be provided to a user device $102_1$ operated by a user1 $128_1$ to facilitate access to a remote file system 168 over the network 117. More specifically, a file tree viewing application 104 might interact with the remote file system interface 161 to view a file tree comprising file tree items associated with objects stored in the remote file system 168. The file tree viewing application 104 might invoke a tree view request 162 to the remote file system interface 161 to retrieve the information from the remote file system 168 to render the file tree in the file tree viewing application 104. For example, the tree view request 162 might correspond to a parent directory and/or folder containing many child items, such as subfolders, files, and/or other objects. In some cases, the number of items in the parent folder can be large. Further, the extent of the relationships (e.g., hierarchical) between the items in the parent folder can be complex.

According to the full file tree view technique 1B100, the tree view request 162 might be processed by the remote file system interface 161 by collecting all the information necessary to render a full file tree pertaining to the parent folder in a full file tree response 164 before issuing a tree view response 163 to render the file tree in the file tree viewing application 104 at the user device $102_1$. With such approaches, such large and/or deep folder structures earlier described can result in a long latency before display of the file tree on the local user device. Such a long latency is depicted in FIG. 1B1 as a delay incurred before full response (e.g., shown as the delay incurred before a file tree view $176_M$ is presented to the user1 $128_1$). In many such cases, the user experience can be negatively impacted. In other cases, the user may not have needed the full file tree to perform the user's intended file or object operations. For example, the user might be seeking a fileG in a folderA that comprises 1,000 objects and 12 hierarchical levels, and the fileG is a direct child of the parent folderA as shown in the file tree view $176_M$. In this case, using the foregoing full file tree view techniques, the user would need to wait until the entire 1,000 items in the subject file tree are ready to be rendered, even though the user might only need to access the fileG. Such a situation can be improved upon. Specifically, certain of the herein disclosed techniques for file tree streaming in a virtual file system for a highly collaborative cloud-based environment can reduce or eliminate user dissatisfaction associated with long latencies. Possible approaches are shown and described as pertains to FIG. 1B2 and FIG. 1B3.

FIG. 1B2 presents a file tree streaming technique 1B200 facilitated by a virtual file system in a highly collaborative cloud-based environment. As an option, one or more variations of file tree streaming technique 1B200 or any aspect thereof may be implemented in the context of the architecture and functionality of the embodiments described herein. The file tree streaming technique 1B200 or any aspect thereof may be implemented in any environment.

The file tree streaming technique 1B200 depicts a technique for progressively building a local file tree view of shared content stored on a cloud-based storage system using a metadata stream from the cloud-based storage system. Specifically, in one or more embodiments, instances of a virtual file system module (e.g., virtual file system $186_1$, etc.) can be delivered to various user devices (e.g., user device $102_1$, . . . , user device $102_N$) associated with respective users, such as user1 $128_1$, to provide a progressive file tree build $174_1$ at one or more applications (e.g., Windows File Explorer, Mac OS Finder, Linux Nautilus, Konqueror, etc.) represented by the file tree viewing application 104. For example, the virtual file system $186_1$ might receive a file tree request 165 issued from the file tree viewing application 104 to view certain instances of file tree items (e.g., file tree item $173_1$, file tree item $173_2$, file tree item $173_3$) corresponding to various objects from a set of shared content 180 stored in the storage devices 120 of the cloud-based storage system 110. In some embodiments, the aforementioned certain instances of file tree items might be a leaf node, in which case directory metadata for the parent of the leaf node will be prefetched.

In some embodiments, a tree streaming engine 192 at the virtual file system $186_1$ can intercept the file tree request 165 to dispatch a file tree item request 177 to the cloud-based storage system 110. The cloud-based storage system 110 can respond to the file tree item request 177 by generating a file tree metadata stream 178 of discrete messages and delivering to the virtual file system $186_1$. In some embodiments, and as shown, the file tree metadata stream 178 can comprise a sequence of one or more instances of a file tree metadata message (e.g., file tree item metadata message $179_1$, . . . , file tree item metadata message $179_3$, . . . , file tree item metadata message $179_M$). In some cases, the file tree item request 177 might call for a certain collection of metadata pertaining to the items associated with the file tree request 165 to be fetched from the object metadata 194 to be included in the sequence of file tree metadata messages. As an example, a first file tree metadata message might describe a single file tree item, while a second file tree metadata message might describe several file tree items.

The tree streaming engine 192 at the local instance of the virtual file system $186_1$ can receive the file tree metadata stream 178 to deliver a file tree response sequence 167 to the file tree viewing application 104. For example, each file tree response comprising the file tree response sequence 167 might correspond to a respective instance of the file tree item metadata messages comprising the file tree metadata stream 178. In such cases, each file tree response comprising the file tree response sequence 167 can be used to display the file tree items associated with each response to facilitate the progressive file tree build $174_1$. For example, the file tree response from the file tree response sequence 167 corresponding to the file tree item metadata message $179_1$ might facilitate the file tree rendering in a file tree view $176_1$. Further, the file tree item metadata message $179_3$ and the file tree item metadata message $179_M$ can facilitate the file tree rendering in a file tree view $176_3$ and a file tree view $176_M$, respectively. In some cases, the tree streaming engine 192 might facilitate the progressive file tree build $174_1$ by closing the file tree request from the file tree viewing application 104 and invoking a new file tree request for the remaining file tree items once each file tree response in the file tree response sequence 167 is delivered. In such cases, a file tree request sequence 166 can transact between the file tree viewing application 104 and the virtual file system $186_1$.

In some embodiments, certain file tree item attributes from the file tree item metadata messages can be stored in a set of local metadata $196_1$ at the virtual file system $186_1$. Such file tree item attributes might be used by the virtual file system $186_1$ to perform various operations pertaining to the file tree items. For example, the file tree item attributes in the local metadata $196_1$ might be used to access (e.g., locally and/or at the cloud-based storage system 110) certain objects associated with the file tree items. In some cases, the file tree item attributes and/or other information in the file tree item metadata messages can characterize relationships (e.g., hierarchical relationship, parent-child relationship, etc.) between the file tree items. For example, such relationship information can facilitate the visual rendering of the file tree in the file tree viewing application 104. In other embodiments, a collection of prefetched file tree item metadata 175 might be prefetched from the cloud-based storage system 110 based on the file tree request 165, the file tree request sequence 166, other historical file tree requests, and/or other information. In other situations, prefetching can be initiated on the basis of user-initiated tags, a list of identified file types, historical accesses, hovering, etc.

In exemplary cases the entire hierarchical level of a file tree need not be retrieved when servicing a user tree view request. A progressive file tree build can be stopped at any moment in time, even before an entire hierarchical level has been retrieved. Further, a progressive file tree build can be stopped at any moment in time, even before an entire branch has been retrieved. Some such cases are shown and described as pertains to FIG. 1B3.

FIG. 1B3 presents a file tree streaming technique 1B300 facilitated by a virtual file system in a highly collaborative cloud-based environment. As an option, one or more variations of file tree streaming technique 1B300 or any aspect thereof may be implemented in the context of the architecture and functionality of the embodiments described herein. The file tree streaming technique 1B300 or any aspect thereof may be implemented in any environment.

The file tree streaming technique 1B300 depicts a technique for closing a local file tree view of shared content stored on a cloud-based storage system using a metadata stream from the cloud-based storage system.

In this example, the virtual file system $186_1$ might receive a file tree request 165 issued from the file tree viewing application 104 to view a certain file tree item (e.g., file tree item $173_4$). When servicing a user tree view request, the entire hierarchical level of a file tree need not be retrieved. A progressive file tree build $174_2$ can be stopped at any moment in time, even before an entire hierarchical level has been retrieved. In this particular example, the progressive file tree build is stopped when sufficient metadata pertaining to fileJ (see file tree item $173_4$) has been retrieved so as to present the file tree view $176_J$.

According to some embodiments, the foregoing file tree streaming techniques and/or other capabilities can be facilitated by the herein disclosed techniques using a virtual file system in a highly collaborative cloud-based environment. One embodiment of such a cloud-based environment is shown and described as pertains to FIG. 1C.

Figure 2:
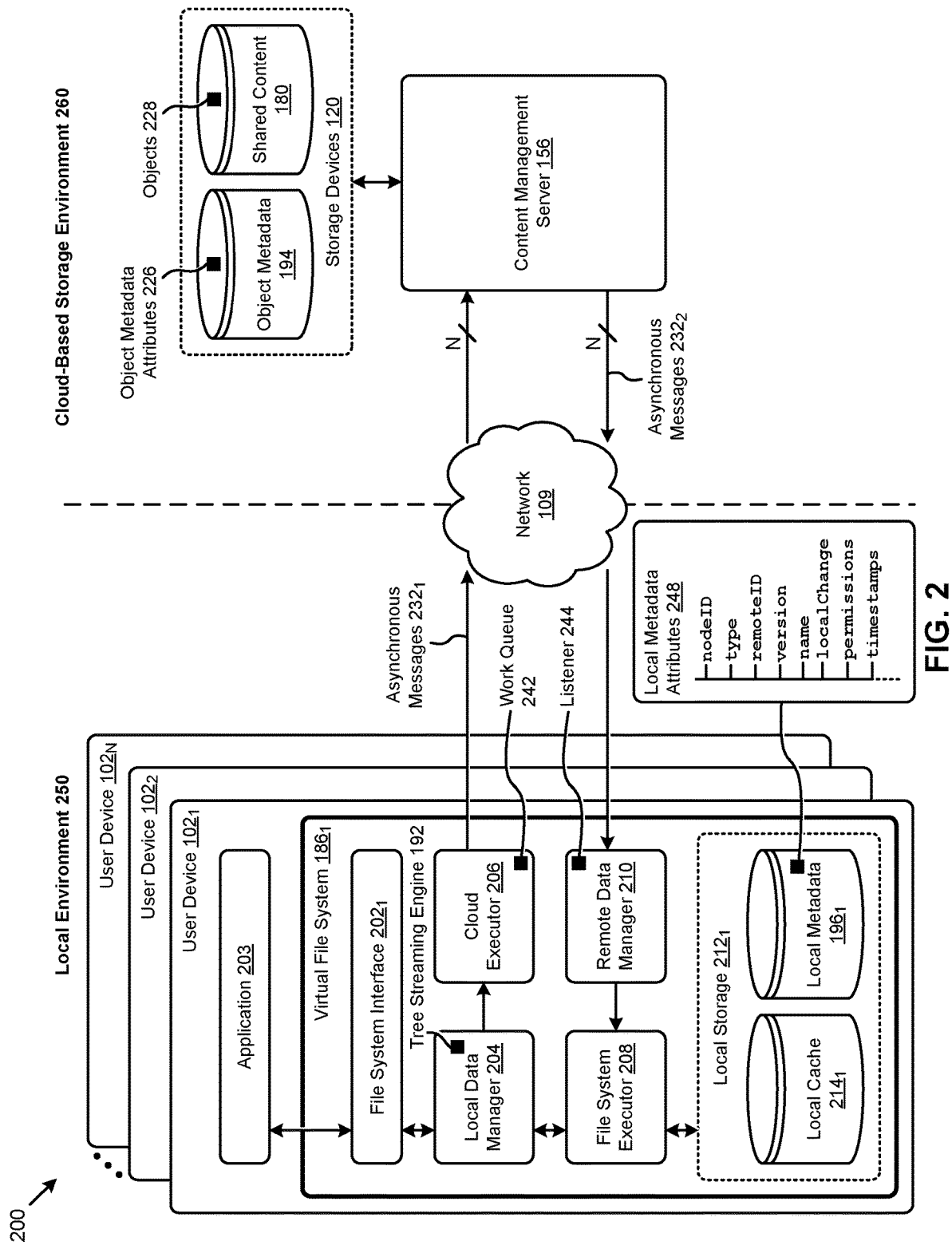

FIG. 1C depicts a cloud-based environment 1C00 including a collaborative cloud-based shared content management platform that facilitates file tree streaming in a virtual file system. As an option, one or more variations of cloud-based environment 1C00 or any aspect thereof may be implemented in the context of the architecture and functionality of the embodiments described herein. The cloud-based environment 1C00 or any aspect thereof may be implemented in any environment.

As shown, certain users (e.g., collaborators 121) having various collaboration roles (e.g., user collaborator 123, administrator collaborator 124, creator collaborator 125, etc.) can use one or more instances of user devices 102 to interact with one or more workspaces (e.g., workspace $122_1$, workspace $122_2$, etc.) within the cloud-based environment 1C00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 118, a content management server 156, an application server 153, a cloud drive server 158, a content server 154, etc.

Any of the users can access shared content from the cloud-based shared content storage system 101 without the additional process of manually downloading and storing a file locally on an instance of the user devices 102 such as a desktop computer, a tablet, a WiFi phone, a workstation, a laptop, a smart phone, and/or other user devices. For example, a content object (e.g., computer file, text document, audio file, video file, image file, etc.) created by the creator collaborator 125 might be viewed by the user collaborator 123 without informing the user collaborator 123 where the file is physically stored in the storage devices. Such a facility streamlines the frequently repeated sharing and collaboration processes.

Functions and techniques performed by the cloud-based shared content storage system 101 and/or the client side components (e.g., user devices 102, a collaboration client and/or application on an instance of the user devices 102, etc.) are described herein with further details and with reference to several examples. Further details pertaining to implementing the herein disclosed techniques in the cloud-based environment 1C00 are described in FIG. 1D.

Figure 1D:
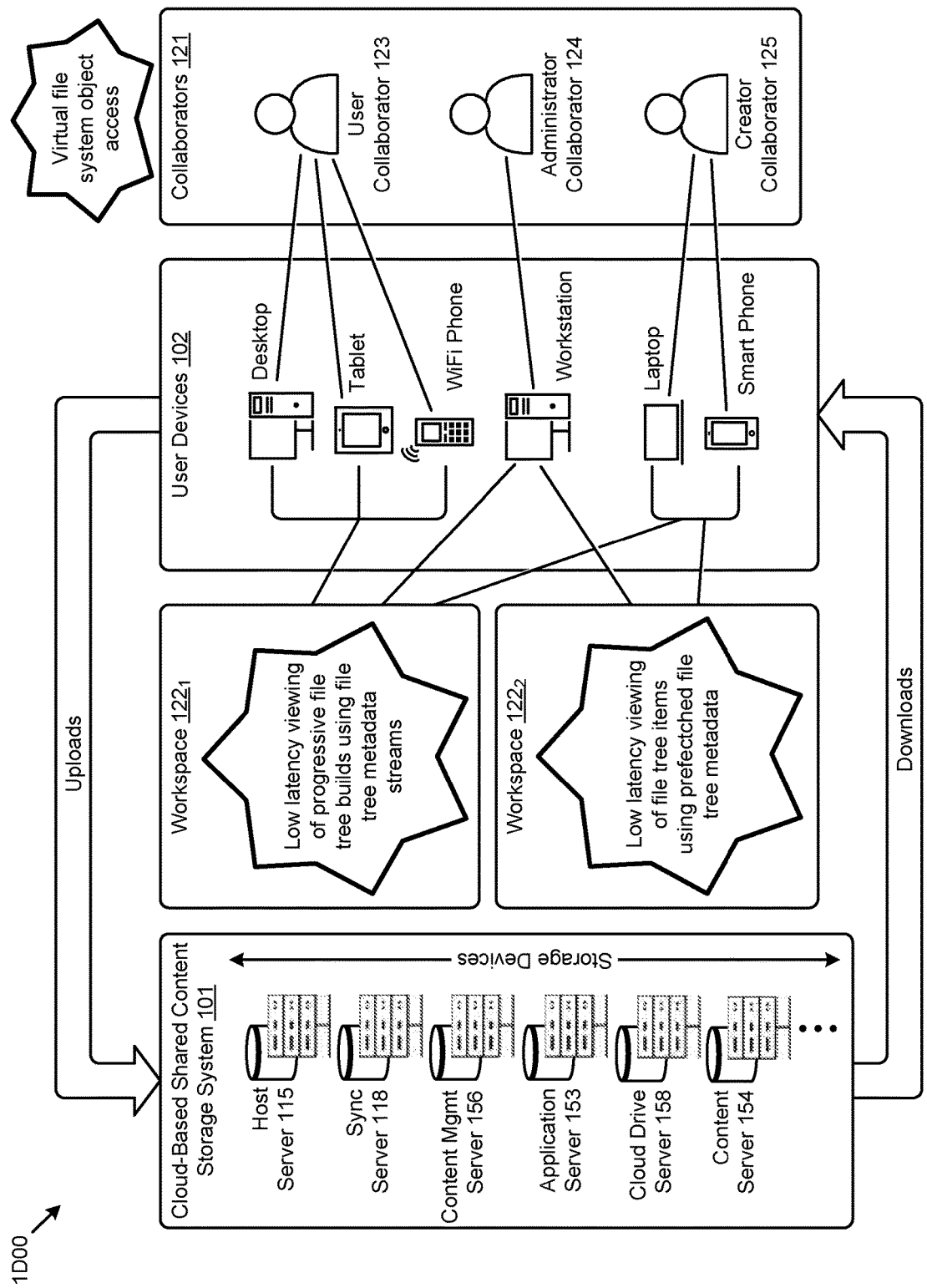
FIG. 1D depicts a schematic view of a cloud-based environment having workspace activity pertaining to file tree streaming in a virtual file system, according to an embodiment.

FIG. 1D depicts a schematic view 1D00 of a cloud-based environment having workspace activity pertaining to file tree streaming in a virtual file system. As an option, one or more variations of schematic view 1D00 or any aspect thereof may be implemented in the context of the architecture and functionality of the embodiments described herein. The schematic view 1D00 or any aspect thereof may be implemented in any environment.

The embodiment shown in FIG. 1D is merely one example of various activities and/or operations facilitated by the herein disclosed techniques for file tree streaming in a virtual file system in a highly collaborative cloud-based environment. Specifically, and as shown, the collaborators 121 (e.g., the user collaborator 123, the administrator collaborator 124, and the creator collaborator 125) in the cloud-based environment might use an instance of the virtual file system on one or more of the user devices 102 to access various shared content (e.g., objects) stored in the storage devices of the cloud-based shared content storage system 101. As shown in workspace $122_1$, the herein disclosed virtual file system techniques can facilitate low latency viewing (e.g., at each instance of the user devices 102) of progressive file tree builds (e.g., of content stored by the cloud-based shared content storage system 101) using file tree metadata streams. Further, and as shown in workspace $122_2$, the herein disclosed virtual file system techniques can also facilitate low latency viewing of file tree items using prefetched file tree metadata (e.g., from the cloud-based shared content storage system 101).

One embodiment of a system for implementing the herein disclosed techniques for file tree streaming in a virtual file system for cloud-based shared content is described as pertaining to FIG. 2.

FIG. 2 presents an interconnection diagram 200 showing communications between system components that cooperate to implement file tree streaming in a virtual file system. As an option, one or more variations of interconnection diagram 200 or any aspect thereof may be implemented in the context of the architecture and functionality of the embodiments described herein. The interconnection diagram 200 or any aspect thereof may be implemented in any environment.

FIG. 2 presents various system components in a local environment 250 and a cloud-based storage environment 260 that can be used to implement a virtual file system according to the herein disclosed techniques. Specifically, each instance of various user devices (e.g., user device $102_1$, user device $102_2$, . . . , user device $102_N$) can run certain applications that can interface with a local instance of the virtual file system. More specifically, the user device $102_1$ is shown running an application 203 (e.g., file tree viewing application) that interacts with the virtual file system $186_1$.

According to some embodiments, the virtual file system $186_1$ can comprise a file system interface $202_1$, a local data manager 204, a cloud executor 206, a file system executor 208, a remote data manager 210, and a local storage $212_1$. As shown, the local storage $212_1$ can comprise a local cache $214_1$ and a set of local metadata $196_1$. For example, the local cache $214_1$ might comprise one or more partitions of the local memory of the user device $102_1$. Further, the local metadata $196_1$ can comprise internal data structures for fast access. In some cases, such internal data structures can be protected (e.g., locked). Further, data structures for the local metadata $196_1$ can hold a set of local metadata attributes 248, as shown. For example, the local metadata attributes 248 for each object accessible by the virtual file system $186_1$ might include a nodeID uniquely identifying a certain node in a file tree associated with the object, a type attribute describing the node and/or object type (e.g., folder, file, etc.), a remoteID uniquely identifying the object in the cloud-based storage environment 260, a version attribute describing the version of the object (e.g., from the perspective of the local environment 250), a name for the object, a localChange bit indicating a local change (e.g., bit=1) that has yet to be confirmed at the cloud-based storage environment 260, a set of permissions for the object (e.g., full access, view-only, unlocked, locked, etc.), one or more timestamps to indicate various events (e.g., last accessed, last modified, created, etc.), and/or other attributes. In some cases, the localChange bit might indicate that a local change has occurred merely for a short time, since it can be cleared (e.g., bit=0) when confirmation that change was committed remotely has been received by the virtual file system $186_1$. In other cases, the local metadata $196_1$ can be specific to the operating system (OS) of the user device. For example, the structure and/or attributes associated with the local metadata $196_1$ might be established at compile time of the virtual file system $186_1$ based at least in part on a target OS. As a specific example for Mac OS, the local metadata attributes 248 might further include xattr extended attributes, a UID user identifier, and/or a groupID group identifier.

As shown in the cloud-based storage environment 260, a content management server 156 can represent the various computing devices that carry out the operations of a cloud-based shared content storage platform (e.g., cloud-based shared content storage system 101 in FIG. 1C). The content management server 156 can interface with the storage devices 120 that can comprise the shared content 180, the object metadata 194, and/or other data to facilitate the cloud-based storage operations. As shown, the object metadata 194 can comprise certain instances of object metadata attributes 226 that characterize the objects 228 stored in the cloud-based storage environment 260. For example, the object metadata attributes 226 might include certain attributes that characterize the location, version, permissions, access rules, and/or other characteristics of a given object. Further, the shared content 180 can store the objects 228 comprising the underlying data accessed by the various user devices in the local environment 250 using the herein disclosed techniques.

In some cases, certain portions of the objects 228 might be stored in the local cache $214_1$ (e.g., for low latency access), but the portion of the objects 228 stored in the shared content 180 can be substantially larger than the portion of the objects 228 stored in the local cache $214_1$. For example, the user of the user device $102_1$ might belong to an enterprise that owns large volumes of shared enterprise content that the user might need to access. However, the user device $102_1$ might only be able to store a small portion of the shared enterprise content. Access to such large volumes of shared content stored on a remote cloud-based storage platform by multiple collaborators using resource-limited (e.g., memory-limited) local user devices can be facilitated by the embodiment of the herein disclosed virtual file system shown in FIG. 2.

Specifically, the user of the user device $102_1$ might invoke various file system operations from the application 203 that are then received by the file system interface $202_1$ of the virtual file system $186_1$. The file system interface $202_1$ can interpret the file system calls (e.g., in an application-specific and/or OS-specific structure) for dispatch to the local data manager 204 in a structure common (e.g., platform-agnostic, OS-agnostic) to the virtual file system $186_1$. In some embodiments, the tree streaming engine 192 might be implemented in the local data manager 204 to intercept certain calls (e.g., file tree requests) to facilitate the various techniques disclosed herein (e.g., file tree streaming). In response to the dispatched call from the file system interface $202_1$, the local data manager 204 can issue one or more commands and/or calls to the file system executor 208 and/or the cloud executor 206. For example, the file system executor 208 might process commands for the local environment 250, while the cloud executor 206 might process commands for the cloud-based storage environment 260. Specifically, the file system executor 208 can process commands and/or calls associated with the local storage $212_1$, such as a change to the local metadata $196_1$ and/or a change to the local cache $214_1$. For example, an edit to a portion (e.g., chunk) of an object using the application 203 might invoke a call to the file system executor 208 to change various metadata attributes (e.g., version, size, last modified timestamp, etc.) in the local metadata $196_1$ and/or change portions of the local cache $214_1$ corresponding to the modified object chunk. In some cases, such operations by the file system executor 208 are invoked synchronously in response to the originating file system call dispatched from the file system interface $202_1$.

In comparison, the cloud executor 206 can receive calls from the local data manager 204 into a work queue 242 for asynchronous delivery (e.g., see asynchronous messages $232_1$) to the content management server 156 through the network 117. For example, the foregoing edit to a portion of an object using the application 203 might also invoke a call to the cloud executor 206 to change various object metadata attributes (e.g., version, size, last modified timestamp, etc.) in the object metadata 194 and/or change portions of the shared content 180 corresponding to the modified object chunk. Such operations can be issued from the work queue 242 as an instance of the asynchronous messages $232_1$. As shown, the content management server 156 can receive such asynchronous messages from any and all (e.g., N) user devices of various collaborators. A content management server 156 can reconcile the information (e.g., versions, object changes, etc.) received from the local environment 250 to deliver (e.g., broadcast) the reconciled information to the N user devices of the collaborators in a set of asynchronous messages $232_2$. For example, the asynchronous messages $232_2$ might include metadata updates and/or object updates. Such asynchronous updates can be received locally by a listener 244 at the remote data manager 210. The remote data manager 210 can schedule the received changes with the file system executor 208 to be applied to the local storage $212_1$. This approach enables each collaborator to work asynchronously (e.g., independently) on various shared content, yet receive low latency (e.g., near real-time) updates pertaining to operations performed by other collaborators in a respective instance of the local environment 250.

The system components of FIG. 2 present merely one partitioning. The specific example shown is purely exemplary, and other partitioning is reasonable. One embodiment of an environment and protocol supporting such systems, subsystems and/or partitionings for implementing a virtual file system that facilitates file tree streaming in a highly collaborative cloud-based environment is shown in FIG. 3.

FIG. 3 depicts an environment 300 that supports a communication protocol pertaining to file tree streaming implemented using components of a virtual file system in a highly collaborative cloud-based environment. As an option, one or more variations of environment 300 or any aspect thereof may be implemented in the context of the architecture and functionality of the embodiments described herein. The environment 300 or any aspect thereof may be implemented in any environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such infrastructure for communications between computing systems. The wireless network 307, the network 308, and the content delivery network 309 can also collectively be referred to as the Internet. The content delivery network 309 can comprise any combination of a public network and a private network.

More specifically, environment 300 can comprise at least one instance of the content management server 156 and the at least one instance of the storage devices 120. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the content management server 156 and the storage devices 120 can comprise a cloud-based content management platform that provides shared content management and storage services.

The environment 300 further comprises instances of user devices (e.g., user device $102_1$) that can represent one of a variety of other computing devices (e.g., a smart phone, a tablet, a WiFi phone, a laptop, a workstation, etc.) having software (e.g., operating system, applications, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and/or through the content delivery network 309. As shown, the user device $102_1$ can be operated by the user1 $128_1$. Also, the user device $102_1$ might have installed one or more applications (e.g., that can request and view file trees) represented by the file tree viewing application 104. To facilitate the herein disclosed techniques, an instance of the virtual file system $186_1$ can operate on the user device $102_1$. The storage devices 120 can comprise the shared content 180 and the object metadata 194, to, in part, facilitate the herein disclosed techniques.

As shown, the user device $102_1$, the content management server 156, and the storage devices 120 can exhibit a set of high order interactions (e.g., operations, messages, etc.) in a protocol 320. Specifically, and as shown, the file tree viewing application 104 can be launched at the user device $102_1$ (see operation 322). In response to launching the application, the virtual file system $186_1$ can request the root node information for the virtual file system (VFS) from the content management server 156 (see operation 324). For example, the root node information might include the root directory and its first level of child nodes. The content management server 156 can get the corresponding root node metadata from the object metadata 194 (see message 326) to deliver for receipt by the virtual file system $186_1$ at the user device $102_1$ (see message 328).

At some later moment in time, the virtual file system $186_1$ might receive a file tree request from the file tree viewing application 104 at the user device $102_1$ (see operation 330). The virtual file system $186_1$ can respond by issuing to the content management server 156 a request for all the file tree item metadata for the file tree items associated with the file tree request (see message 332). The content management server can invoke a sequence of one or more calls to the storage devices 120 (e.g., the object metadata 194) to fetch the file tree metadata (see message 334 to message 335). In some cases, fetching the file tree item metadata from the object metadata 194 at the content management server 156 can be a low latency operation due to a tightly coupled, high performance storage access architecture characterizing the cloud-based content management platform.

According to the herein disclosed techniques, the virtual file system $186_1$ at the user device $102_1$ can receive from the content management server 156 a sequence of one or more file tree item metadata messages containing certain portions of the file tree item metadata (see message 336 and message 337). As shown, such a sequence of file tree item metadata messages 377 can form a file tree metadata stream 178. As each file tree item metadata message is received at the virtual file system $186_1$, the received metadata can be used to display the corresponding file tree items in the file tree viewing application 104 (see operation 338). The display operation can be repeated for each file tree item metadata message received until the file tree request is optionally closed (see operation 340), or until the completed file tree can be rendered in the file tree viewing application 104 (see operation 339). The stream can be closed any time after the certain sought after portions of the file tree item metadata have been received. When all of the file tree item metadata that is used to display the completed file tree, or at least when the portions of the file tree item metadata pertaining to the sought after item has been received, the invoking file tree request can be closed (see operation 341).

Figure 4A:
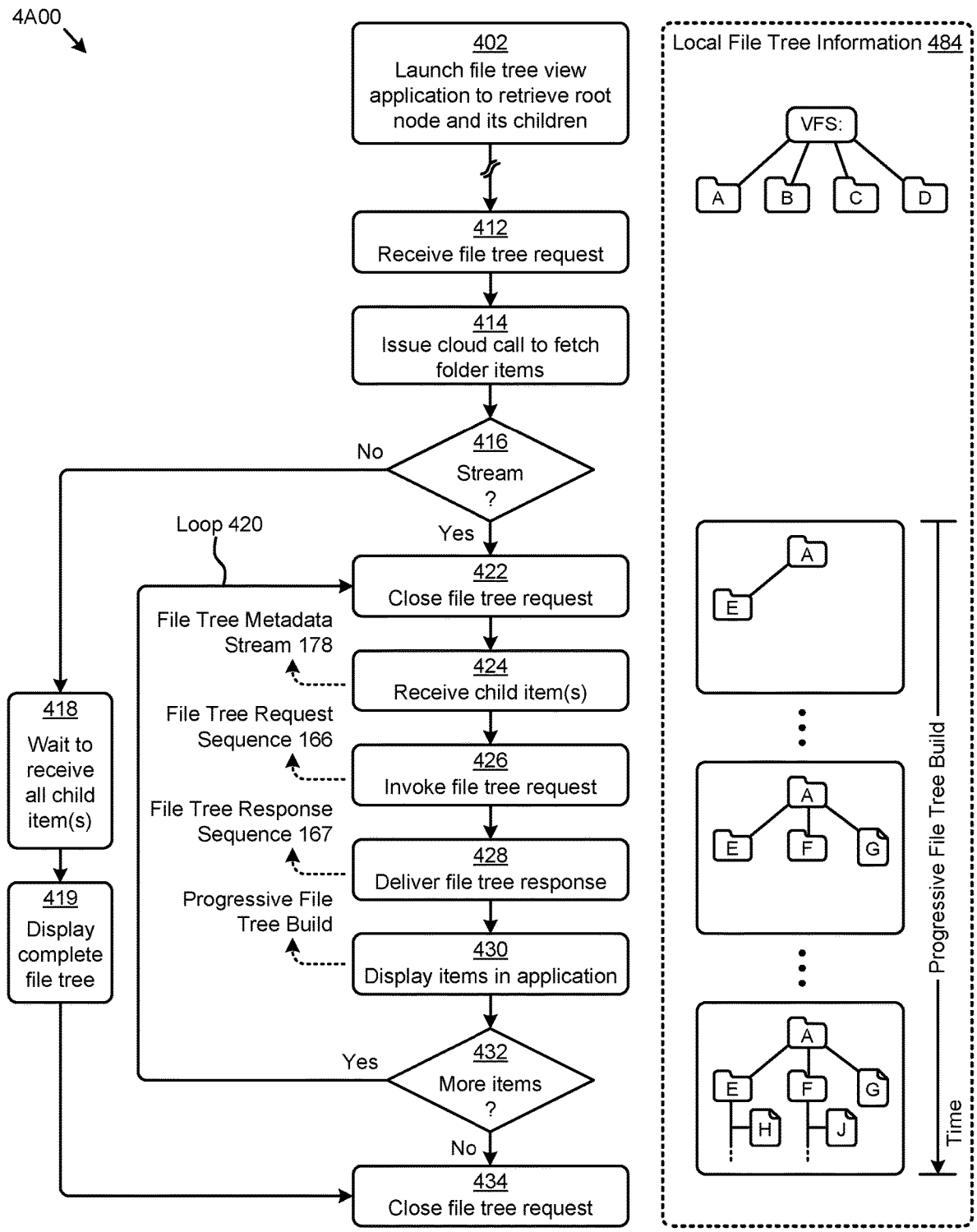
FIG. 4A presents a file tree construction technique facilitated by a protocol for file tree streaming in a collaborative cloud-based environment, according to some embodiments.

Further details pertaining to a technique for progressively building and/or constructing a file tree in one or more user devices is described in FIG. 4A.

FIG. 4A presents a file tree construction technique 4A00 facilitated by a protocol for file tree streaming in a collaborative cloud-based environment. As an option, one or more variations of a file tree construction technique 4A00 or any aspect thereof may be implemented in the context of the architecture and functionality of the embodiments described herein. The file tree construction technique 4A00 or any aspect thereof may be implemented in any environment.

The file tree construction technique 4A00 presents one embodiment of certain steps for low latency construction, in a local user device, of a file tree for objects from a cloud-based storage system using a virtual file system having file streaming capabilities as implemented according to the herein disclosed techniques. In one or more embodiments, the steps and underlying operations shown in the file tree construction technique 4A00 can be facilitated, in part, by a tree streaming engine in a local data manager of the virtual file system, such as described in FIG. 2 and throughout this specification. As shown, the file tree construction technique 4A00 can commence with the launch of a file tree viewing application (e.g., on a local user device) invoking a request to retrieve the root node and root node children associated with the virtual file system interfacing with the application (see step 402). For example, as shown in the local file tree information 484 corresponding to the file tree construction technique 4A00, metadata might be received that describes a "VFS:" root node having four children: a folderA, a folderB, a folderC, and a folderD.

At some later moment in time, the virtual file system might receive a file tree request from the file tree viewing application (see step 412). For example, a file tree request to view all items in folderA might be received (e.g., readdir(/A)). The virtual file system can respond by issuing a call (e.g., to a public API) to the cloud-based storage system to fetch file tree items associated with folderA (see cloud call in step 414). In some situations, only portions of the file tree need to be requested. As examples, the operations of step 414 might traverse portions of the file tree based on a depth-first traversal, or a breadth-first traversal, or a traversal of only the ancestors of folderA. It is also possible to issue a cloud call to fetch all descendants of folder items in folderA, however in many cases it is possible to issue a call to fetch just the immediate next level descendant, and then issue subsequent calls if and when another file tree request is received. Some embodiments prospectively prefetch portions or groups of the descendants and their descendants, and so on. Determination as to portions or groups that are to be prospectively prefetched can be made on the basis of received metadata that pertains to any of the previously retrieved and/or prefetched items.

The virtual file system can then determine whether file tree streaming can be executed for the received file tree request (see decision 416). For example, certain application environments (e.g., Linux operating system) might have certain file tree requests (e.g., the ls command) that might not support file tree streaming according to the herein disclosed techniques. In such cases (see "No" path of decision 416), the file tree construction technique 4A00 can wait until all child items for the requested file tree are received (see step 418) to then display the complete file tree (see step 419), after which the file tree request can be closed (see step 434).

In cases where tree streaming can be implemented (see "Yes" path of decision 416), the virtual file system can close the file tree request from the file tree viewing application (see step 422). For example, closing the file tree request (e.g., empty readdir(/A)) can signal to the application that no file tree items are currently available for display such that the application might perform other background processing and maintain a positive user experience. The virtual file system can receive information (e.g., metadata from the cloud-based storage system) pertaining to one or more child items of the requested file tree (see step 424). When a certain collection of child item metadata has been received, a file tree request can be invoked at the file tree viewing application (see step 426). In some cases, the file tree request can be invoked from the file tree viewing application responsive to a file tree update available signal from the virtual file system. The virtual file system can deliver a response to the file tree corresponding to the received child items (see step 428) to facilitate displaying the child items in the file tree viewing application (see step 430). For example, a first set of child items for the subject folderA might merely comprise folderE. In this case, the invoked file tree request (e.g., readdir(/A)) can occur responsive to receiving the information pertaining to folderE such that the folderE item can be displayed as shown in the local file tree information 484.

When the most recently received items have been displayed, the file tree construction technique 4A00 can determine if further items (e.g., remaining items) are to be received for the requested file tree (see decision 432). If there are remaining items to be received (see "Yes" path of decision 432), the flow can return to close the most recently invoked file tree request at the file tree viewing application (see step 422).

The steps of receiving further child items, invoking a file tree request, delivering a file tree response, displaying the items in the application, and/or other related steps, can be iteratively repeated in a loop 420 until all items for the file tree are received and displayed. For example, the file tree construction technique 4A00 might close a first file tree request responsive to receiving a first portion of the file tree items (e.g., folderE) and then invoke a second file tree request to display a second portion of the file tree items (e.g., folderF and fileG), as shown in the local file tree information 484. In some cases, the virtual file system might provide certain parameters to the file tree viewing application pertaining to the remaining items to be displayed in the file tree for issuing a new instance of the file tree request. As shown, iterations through the loop 420 can generate certain earlier described components pertaining to the herein disclosed techniques. For example, an iterative sequence of received child items can be associated with the file tree metadata stream 178. Also, an iterative sequence of invoked file tree requests (e.g., from the file tree viewing application to the virtual file system) can be associated with the file tree request sequence 166. Further, an iterative sequence of delivered file tree responses (e.g., from the virtual file system to the file tree viewing application) can be associated with the file tree response sequence 167. The iterative display of items in the file tree viewing application can also be associated with a progressive file tree build, as is illustrated in the graphic depiction labeled as local file tree information 484. When no further items are required (see "No" path of decision 432), the then current file tree request can be closed (see step 434).

In some embodiments, certain prefetching techniques pertaining to file tree items can be implemented in the herein disclosed techniques for virtual file systems that facilitate file tree streaming in a highly collaborative cloud-based environment. One such technique is described in FIG. 4B.

Figure 4B:
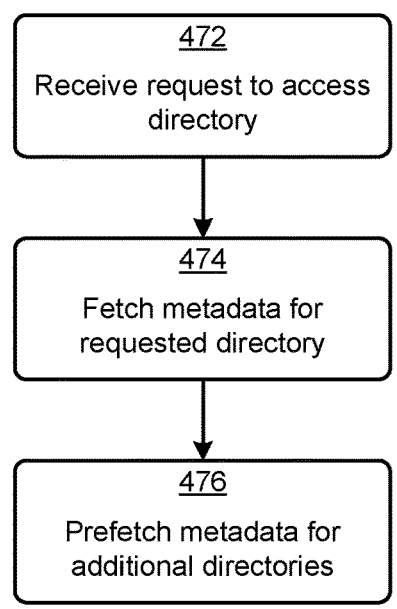
FIG. 4B presents a file tree metadata prefetch technique implemented in a virtual file system that facilitates file tree streaming in a highly collaborative cloud-based environment, according to some embodiments.

FIG. 4B presents a file tree metadata prefetch technique 4B00 implemented in a virtual file system that facilitates file tree streaming in a highly collaborative cloud-based environment. As an option, one or more variations of a file tree metadata prefetch technique 4B00 or any aspect thereof may be implemented in the context of the architecture and functionality of the embodiments described herein. The file tree metadata prefetch technique 4B00 or any aspect thereof may be implemented in any environment.

In some embodiments, prefetching of metadata associated with the items of a file tree may be performed. As an example, on a cold start of a local instance of a virtual file system that can access shared content on a cloud-based storage system, the virtual file system may not yet have information about the various objects accessible by the virtual file system. Specifically, the virtual file system might not have (e.g., stored in local metadata) certain inode metadata and/or other metadata pertaining to directories and/or files in the virtual file system. In some cases, this can be due to such metadata being located in a cloud-based storage system (e.g., in object metadata) and not yet stored locally (e.g., in local metadata) in the virtual file system on a local user device. In such cases, the pertinent metadata can be downloaded to allow the local client (e.g., user device) to have low latency access to information pertaining to the contents within the directories (e.g., file trees) of the virtual file system.

As earlier described (e.g., in file tree construction technique 4A00), the herein disclosed techniques can facilitate such metadata downloading using various file tree streaming techniques in a virtual file system for cloud-based shared content. In most cases, metadata downloads associated with such file tree streaming can be invoked by a file tree request from one or more applications interfacing with the virtual file system. In other cases, the metadata downloads might be prefetched from the cloud-based storage system by the virtual file system based on historical file tree requests and/or other information.

Specifically, the file tree metadata prefetch technique 4B00 shown in FIG. 4B shows a flowchart of an approach for implementing metadata prefetching according to some embodiments. As shown, the file tree metadata prefetch technique 4B00 can commence with a request being received to fetch a certain collection of metadata for the virtual file system (see step 472). For example, a local instance of the virtual file system might invoke such a request. In some cases, the request from the virtual file system might be responsive to a file tree request from an application (e.g., when a user seeks to navigate to a directory). In such cases, the metadata can be fetched for the requested directory and/or file tree (see step 474).

In other cases, the virtual file system might invoke the request to prefetch certain file tree item metadata based on historical file tree requests and/or other information. For example, when a certain application is launched, the virtual file system might prefetch metadata associated with the most recent set (e.g., last 30 days) of directories and/or file trees and/or objects accessed by the application. Such prefetched file tree item metadata for the additional directories and/or file trees and/or objects can then be collected (e.g., prefetched) by the local instance of the virtual file system (see step 476). As another example, such prefetching can be based on a certain likelihood that certain subdirectories of an earlier accessed directory might be later accessed. In such cases, the virtual file system (e.g., possibly using one or more asynchronous worker tasks) can prefetch the metadata associated with those additional subdirectories. In some embodiments, the metadata for multiple levels (e.g., hierarchical levels) of directories and/or folders can be prefetched.

Additional Embodiments of the Disclosure

Additional Practical Application Examples

Figure 5A:
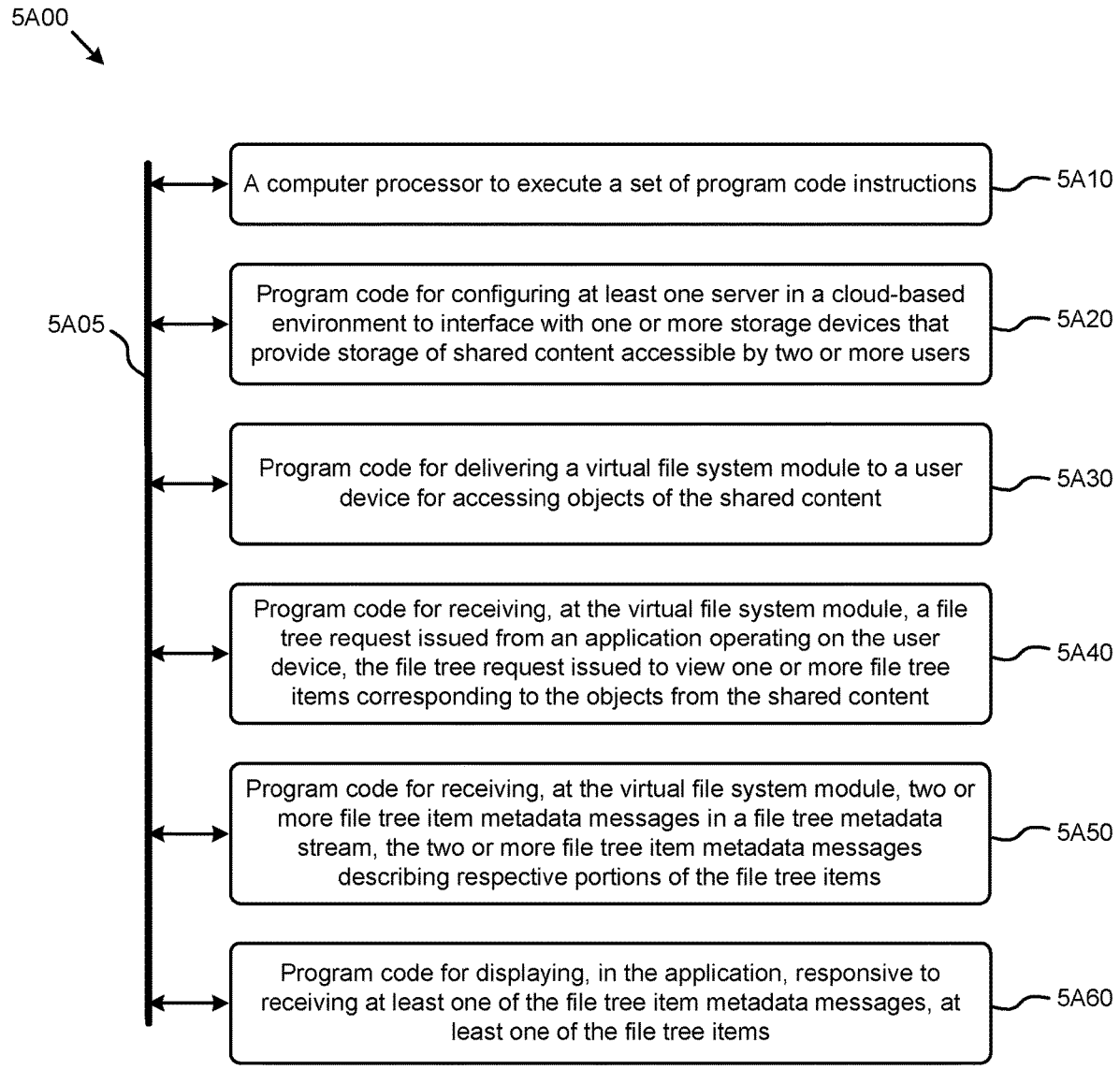
FIG. 5A and FIG. 5B depict system components as arrangements of computing modules that are interconnected so as to implement certain of the herein-disclosed embodiments.

FIG. 5A depicts a system 5A00 as an arrangement of computing modules that are interconnected so as to operate cooperatively to implement certain of the herein-disclosed embodiments. The partitioning of system 5A00 is merely illustrative and other partitions are possible. As an option, the system 5A00 may be implemented in the context of the architecture and functionality of the embodiments described herein. Of course, however, the system 5A00 or any operation therein may be carried out in any desired environment.

The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with other operations over communication path 5A05. The modules of the system can, individually or in combination, perform method operations within system 5A00. Any operations performed within system 5A00 may be performed in any order unless as may be specified in the claims.

The shown embodiment implements a portion of a computer system, presented as system 5A00, comprising a computer processor to execute a set of program code instructions (see module 5A10) and modules for accessing memory to hold program code instructions to perform: configuring at least one server in a cloud-based environment to interface with one or more storage devices that provide storage of shared content accessible by two or more users (see module 5A20); delivering a virtual file system module to a user device for accessing objects of the shared content (see module 5A30); receiving, at the virtual file system module, a file tree request issued from an application operating on the user device, the file tree request issued to view one or more file tree items corresponding to the objects from the shared content (see module 5A40); receiving, at the virtual file system module, two or more file tree item metadata messages in a file tree metadata stream, the two or more file tree item metadata messages describing respective portions of the file tree items (see module 5A50); and displaying, in the application, responsive to receiving at least one of the file tree item metadata messages, at least one of the file tree items (see module 5A60).

Variations of the foregoing may include more or fewer of the shown modules and variations may perform more or fewer (or different) steps and/or may use data elements in more, or fewer, or different operations.

Strictly as examples, some variations include:

Variations that further comprise closing the file tree request responsive to receiving at least some of the file tree item metadata messages describing a first portion of the file tree items, and invoking a second file tree request to display a second portion of the file tree items.

Variations where the file tree item metadata messages are based at least in part on object metadata associated with the shared content stored in the cloud-based environment.

Variations where one or more file tree item attributes from the file tree item metadata messages are stored in local metadata at the virtual file system module.

Variations further comprising acts of issuing a file tree item request to the server in the cloud-based environment.

Variations further comprising acts of generating the file tree metadata stream based at least in part on the file tree item request.

Variations further comprising acts of collecting prefetched file tree item metadata responsive to receiving the file tree request.

Variations where the file tree item metadata messages characterize one or more relationships between the file tree items.

Variations where the one or more relationships between the file tree items comprise a hierarchical relationship or a parent-child relationship.

Figure 5B:
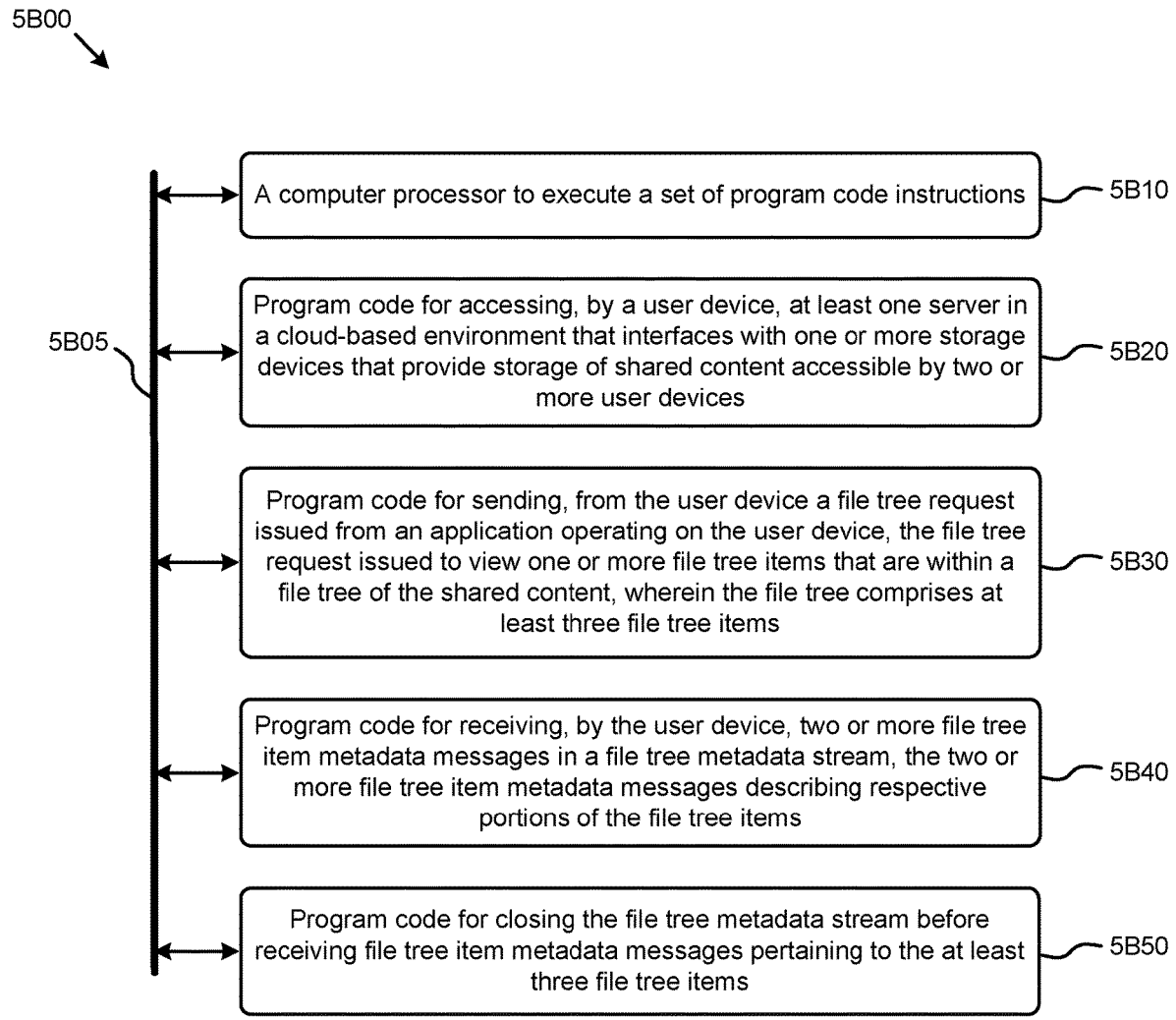

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible. As an option, the system 5B00 may be implemented in the context of the architecture and functionality of the embodiments described herein. Of course, however, the system 5B00 or any operation therein may be carried out in any desired environment.

The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims.

The shown embodiment implements a portion of a computer system, presented as system 5B00, comprising a computer processor to execute a set of program code instructions (see module 5B10) and modules for accessing memory to hold program code instructions to perform: accessing, by a user device, at least one server in a cloud-based environment that interfaces with one or more storage devices that provide storage of shared content accessible by two or more user devices (see module 5B20); sending, from the user device a file tree request issued from an application operating on the user device, the file tree request issued to view one or more file tree items that are within a file tree of the shared content, wherein the file tree comprises at least three file tree items (see module 5B30); receiving, by the user device, two or more file tree item metadata messages in a file tree metadata stream, the two or more file tree item metadata messages describing respective portions of the file tree items (see module 5B40); and closing the file tree metadata stream before receiving file tree item metadata messages pertaining to the at least three file tree items (see module 5B50).

System Architecture Overview

Additional System Architecture Examples

Figure 6A:
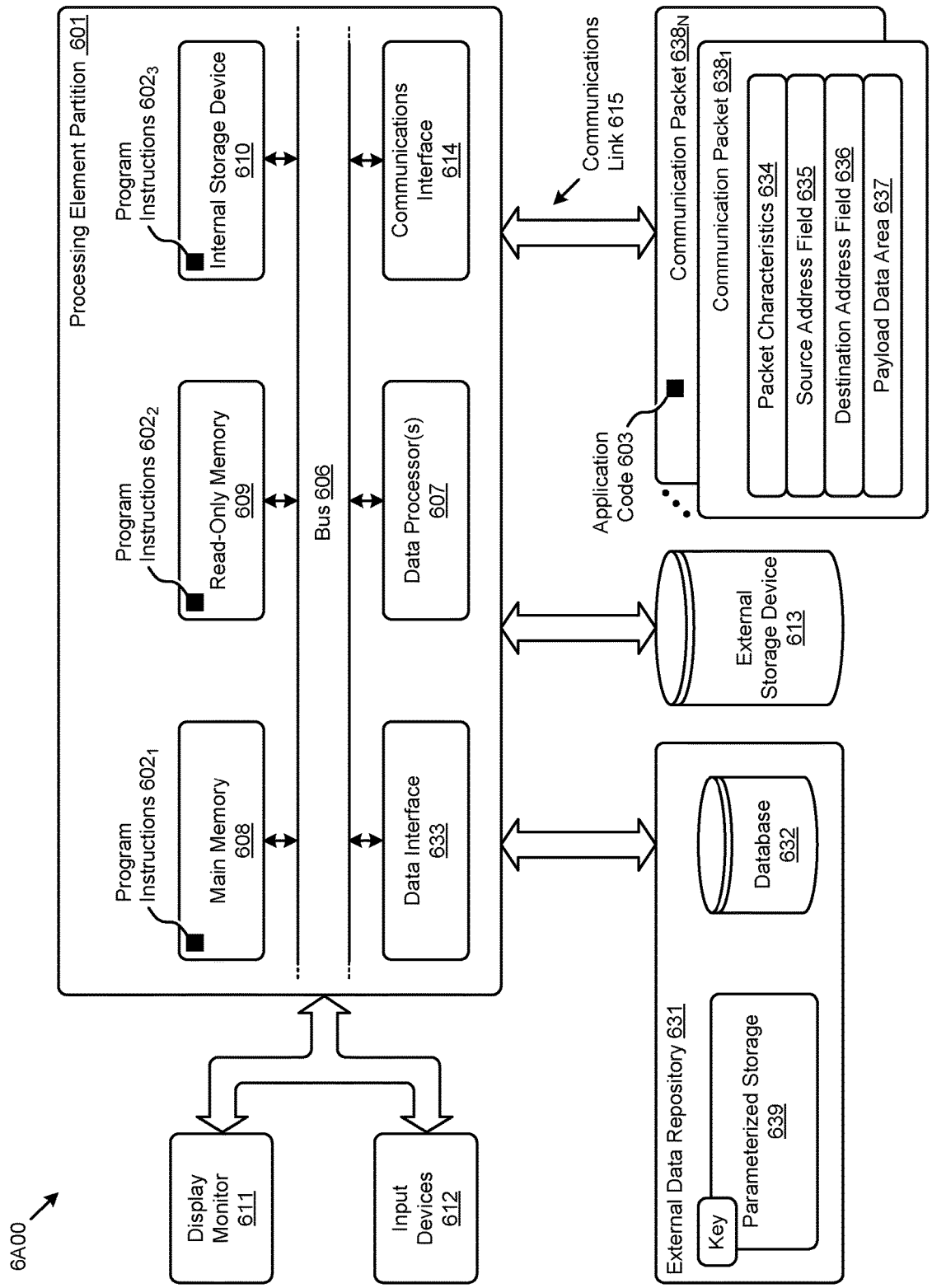
FIG. 6A and FIG. 6B present block diagrams of computer system architectures having components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets (e.g., communications packet $638_1$, and communications packet $638_N$) comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). A module may include one or more state machines and/or combinational logic used to implement or facilitate the operational and/or performance characteristics of file tree streaming in a virtual file system for a cloud-based environment.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of file tree streaming in a virtual file system for a cloud-based environment). Such files or records can be brought into and/or stored in volatile or non-volatile memory.

Figure 6B:
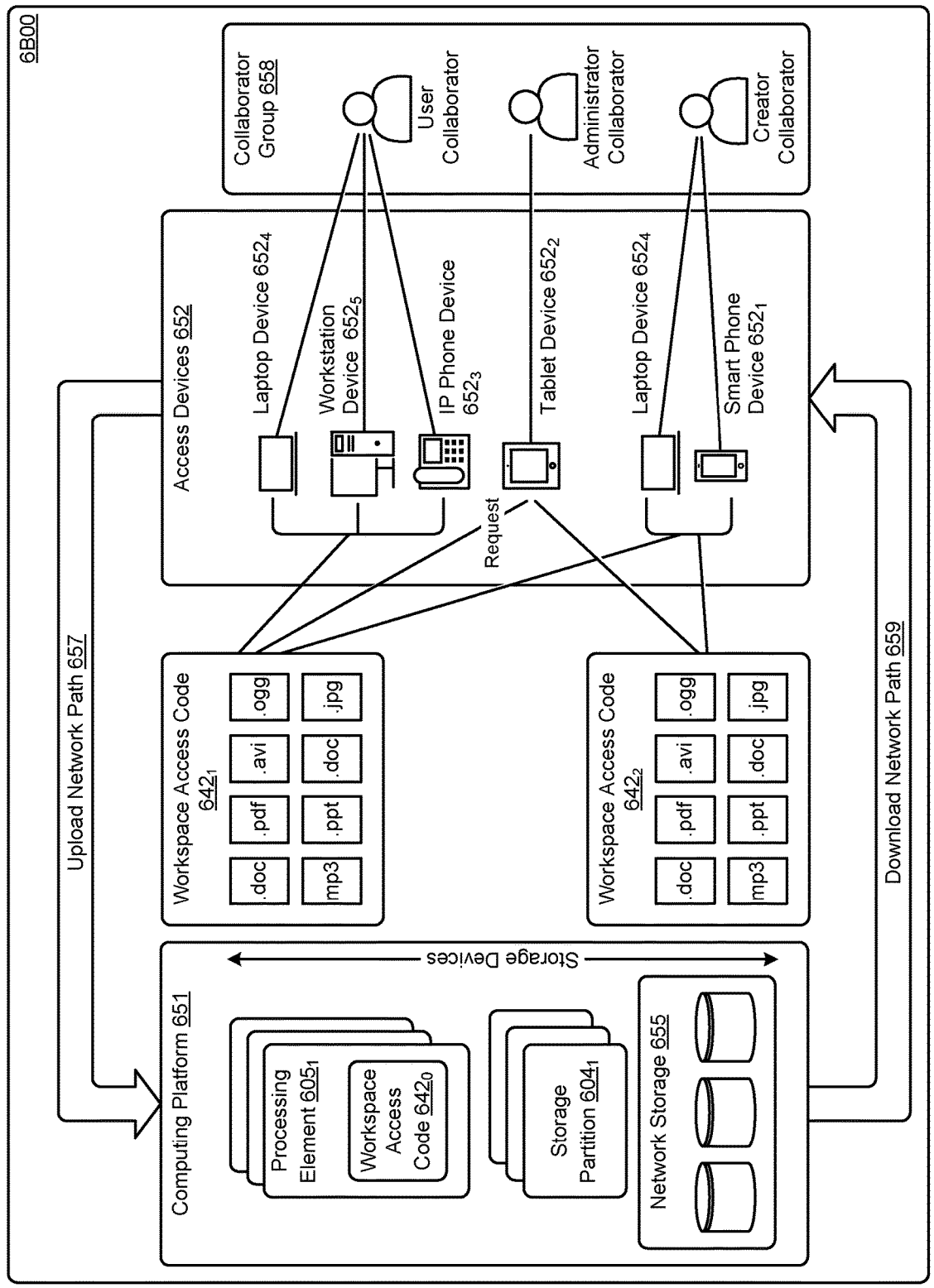

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$.) Workspace access code can be executed on any of the shown access devices 652 (e.g., laptop device $652_4$, workstation device $652_5$, IP phone device $652_3$, tablet device $652_2$, smart phone device $652_1$, etc.). A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such the shown networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for displaying a file tree view in a cloud-based storage system, the method comprising:

receiving a first file tree request to retrieve directory metadata pertaining to a directory in a hierarchical file system within a cloud-based storage system, the directory metadata comprising a plurality of object metadata, wherein the plurality of object metadata comprises at least a first object metadata corresponding to a first folder and a second object metadata corresponding to a second folder, wherein the object metadata characterizes objects stored in respective folders and the first folder and the second folder are separate folders within the same directory;

at a first time period, fetching a first portion of the directory metadata corresponding to the first object metadata from the cloud-based storage system;

at a second time period, displaying a file tree view of the first folder using the first object metadata;

at a third time period, fetching a second portion of the directory metadata corresponding to the second object metadata from the cloud-based storage system; and wherein the file tree view of the first folder using the first object metadata is displayed in the second time period before receiving the second portion of the directory metadata from the cloud-based storage system in the third time period, and wherein the second portion of the directory metadata corresponding to the second object metadata is fetched from the cloud-based storage system for displaying the directory having both the first folder and the second folder after the file tree view of the directory having just the first folder has been displayed.

2. The method of claim 1, further comprising prefetching a portion of the directory metadata from the cloud-based storage system, wherein prefetching of the portion of the directory metadata is determined by at least one of, data location, access patterns, or machine learning, or any combination thereof.

3. The method of claim 2, wherein the second portion of the directory metadata corresponds to metadata for additional levels of a directory hierarchy.

4. The method of claim 1, wherein the plurality of object metadata corresponds to a root node of the directory and at least two child nodes of the directory, the first object metadata corresponds to a first child node of the directory and the second object metadata corresponds to a second child node of the directory.

5. The method of claim 1, further comprising displaying at least a first portion of a set of file tree item metadata messages pertaining to the directory in the hierarchical file system.

6. The method of claim 5, further comprising invoking a second file tree request to retrieve the second portion the directory metadata.

7. The method of claim 6, the second portion corresponds to additional levels of a directory hierarchy.

8. The method of claim 5, wherein the file tree item metadata messages are based at least in part on object metadata associated with shared content stored in the cloud-based storage system.

9. The method of claim 5, wherein the file tree item metadata messages characterize one or more relationships between the file tree items.

10. The method of claim 9, wherein the one or more relationships between the file tree items comprise a hierarchical relationship or a parent-child relationship.

11. A computer program product embodied in a non-transitory computer readable medium, the non-transitory computer readable medium having stored thereon a sequence of instructions which, when stored in memory and executed by a processor causes the processor to perform a set of acts for displaying a file tree view in a cloud-based storage system, the acts comprising:

receiving a first file tree request to retrieve directory metadata pertaining to a directory in a hierarchical file system within a cloud-based storage system, the directory metadata comprising a plurality of object metadata, wherein the plurality of object metadata comprises at least a first object metadata corresponding to a first folder and a second object metadata corresponding to a second folder, wherein the object metadata characterizes objects stored in respective folders and the first folder and the second folder are separate folders within the same directory;

at a first time period, fetching a first portion of the directory metadata corresponding to the first object metadata from the cloud-based storage system;

at a second time period, displaying a file tree view of the first folder using the first object metadata;

at a third time period, fetching a second portion of the directory metadata corresponding to the second object metadata from the cloud-based storage system; and wherein the file tree view of the first folder using the first object metadata is displayed in the second time period before receiving the second portion of the directory metadata from the cloud-based storage system in the third time period, and wherein the second portion of the directory metadata corresponding to the second object metadata is fetched from the cloud-based storage system for displaying the directory having both the first folder and the second folder after the file tree view of the directory having just the first folder has been displayed.

12. The computer readable medium of claim 11, wherein the acts further comprise prefetching a portion of the directory metadata from the cloud-based storage system, wherein prefetching of the portion of the directory metadata is determined by at least one of, data location, access patterns, or machine learning, or any combination thereof.

13. The computer readable medium of claim 11, wherein the plurality of object metadata corresponds to a root node of the directory and at least two child nodes of the directory, the first object metadata corresponds to a first child node of the directory and the second object metadata corresponds to a second child node of the directory.

14. The computer readable medium of claim 11, wherein the acts further comprise displaying at least a first portion of a set of file tree item metadata messages pertaining to the directory in the hierarchical file system.

15. The computer readable medium of claim 14, further comprising instructions which, when stored in memory and executed by the processor causes the processor to perform acts of invoking a second file tree request to retrieve the second portion the directory metadata.

16. The computer readable medium of claim 15, the second portion corresponds to additional levels of a directory hierarchy.

17. The computer readable medium of claim 14, wherein the file tree item metadata messages are based at least in part on object metadata associated with shared content stored in the cloud-based storage system.

18. The computer readable medium of claim 14, wherein the file tree item metadata messages characterize one or more relationships between the file tree items.

19. A system for displaying a file tree view in a cloud-based storage system, the system comprising:

a storage medium having stored thereon a sequence of instructions; and a processor or processors that execute the instructions to cause the processor or processors to perform a set of acts, the acts comprising, receiving a first file tree request to retrieve directory metadata pertaining to a directory in a hierarchical file system within a cloud-based storage system, the directory metadata comprising a plurality of object metadata, wherein the plurality of object metadata comprises at least a first object metadata corresponding to a first folder and a second object metadata corresponding to a second folder, wherein the object metadata characterizes objects stored in respective folders and the first folder and the second folder are separate folders within the same directory;

at a first time period, fetching a first portion of the directory metadata corresponding to the first object metadata from the cloud-based storage system;

at a second time period, displaying a file tree view of the first folder using the first object metadata;

at a third time period, fetching a second portion of the directory metadata corresponding to the second object metadata from the cloud-based storage system; and wherein the file tree view of the first folder using the first object metadata is displayed in the second time period before receiving the second portion of the directory metadata from the cloud-based storage system in the third time period, and wherein the second portion of the directory metadata corresponding to the second object metadata is fetched from the cloud-based storage system for displaying the directory having both the first folder and the second folder after the file tree view of the directory having just the first folder has been displayed.

20. The system of claim 19, wherein the acts further comprise prefetching a portion of the directory metadata from the cloud-based storage system, wherein prefetching of the portion of the directory metadata is determined by at least one of, data location, access patterns, or machine learning, or any combination thereof.

* * * * *